(12) United States Patent
Dimou et al.

(10) Patent No.: US 12,317,270 B2
(45) Date of Patent: May 27, 2025

(54) PHYSICAL UPLINK CONTROL CHANNEL (PUCCH) RESOURCE IDENTIFICATION FOR DEFERRED TRANSMISSION OF ACKNOWLEDGMENT FEEDBACK

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 17/820,717

(22) Filed: Aug. 18, 2022

(65) Prior Publication Data

US 2023/0058150 A1 Feb. 23, 2023

Related U.S. Application Data

(60) Provisional application No. 63/234,960, filed on Aug. 19, 2021, provisional application No. 63/235,128, filed on Aug. 19, 2021.

(51) Int. Cl.
*H04W 72/21* (2023.01)
*H04L 1/1829* (2023.01)
(Continued)

(52) U.S. Cl.
CPC .......... *H04W 72/21* (2023.01); *H04L 1/1861* (2013.01); *H04L 1/1887* (2013.01); *H04L 5/0053* (2013.01)

(58) Field of Classification Search
CPC .... H04W 72/21; H04L 1/1887; H04L 1/1861; H04L 1/1854; H04L 5/0053; H04L 5/0062
See application file for complete search history.

(56) References Cited

U.S. PATENT DOCUMENTS 11,832,283 B2 * 11/2023 Khoshnevisan ...... H04W 72/21
11,889,498 B2 * 1/2024 Taherzadeh Boroujeni ................ H04W 72/20
(Continued)

OTHER PUBLICATIONS

3GPP: "3rd Generation Partnership Project; Technical Specification Group Radio Access Network; NR; Physical Layer Procedures for Data (Release 16)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. 3GPP TS 38.214, V16.6.0, (Jun. 2021), Jun. 2021, 171 Pages, XP052029956.
(Continued)

*Primary Examiner* — Mounir Moutaouakil
(74) *Attorney, Agent, or Firm* — Patterson+ Sheridan, L.L.P.

(57) ABSTRACT

Certain aspects of the present disclosure provide techniques for determining resources to use for deferred transmission of acknowledgment feedback. An example method generally includes monitoring for a semi-persistently scheduled (SPS) physical downlink shared channel (PDSCH); determining that a first resource, identified by a first physical uplink control channel (PUCCH) resource identifier (PRI), for transmitting a physical uplink control channel (PUCCH) with acknowledgment feedback for the SPS PDSCH collides with a downlink resource; identifying a second resource for transmitting the PUCCH based on parameters associated with the first PRI or a second PRI; and transmitting the PUCCH on the second resource.

20 Claims, 12 Drawing Sheets

(51) Int. Cl.
*H04L 1/1867* (2023.01)
*H04L 5/00* (2006.01)

(56) References Cited

U.S. PATENT DOCUMENTS

| | | | | |
|---|---|---|---|---|
| 12,069,746 | B2* | 8/2024 | Yao | H04L 1/1812 |
| 2021/0337538 | A1 | 10/2021 | Li et al. | |
| 2022/0095337 | A1* | 3/2022 | Wang | H04L 5/0053 |
| 2022/0150907 | A1* | 5/2022 | Tian | H04L 1/1854 |
| 2023/0042237 | A1* | 2/2023 | Taherzadeh Boroujeni | H04W 72/54 |
| 2023/0156824 | A1* | 5/2023 | Yao | H04W 74/0858 370/328 |

OTHER PUBLICATIONS

3GPP TR 22.804, "3rd Generation Partnership Project; Technical Specification Group Services and Systems Aspects; Study on Communication for Automation in Vertical Domains (Release 16)", 3GPP TR 22.804, V16.3.0, Jul. 2020, pp. 1-197.

3GPP TS 22.104, "3rd Generation Partnership Project; Technical Specification Group Services and Systems Aspects; Service Requirements for Cyber-physical Control Applications in Vertical Domains; Stage 1 (Release 18)", 3GPP TS 22.104, V18.0.0, Mar. 2021, pp. 1-78.

3GPP TS 38.213, "3rd Generation Partnership Project; Technical Specification Group Radio Access Network; NR; Physical Layer Procedures for Control; (Release 16)", 3GPP TS 38.213, V16.5.0, Mar. 2021, pp. 1-183.

"3rd Generation Partnership Project; Technical Specification Group Radio Access Network; Study on Physical Layer Enhancements for NR Ultra-Reliable and Low Latency Case (URLLC) (Release 16)", 3GPP Standard, Technical Report, 3GPP TR 38.824, 3rd Generation Partnership Project, Mobile Competence Centre, 650, Route Des Lucioles, F-06921 Sophia-Antipolis Cedex, France, No. V16.0.0, Mar. 27, 2019, pp. 1-78, XP051722955, pp. 1-92, Chapter 6.4.2, "out-of-order HARQ and PUSCH scheduling".

CATT, "UE Feedback Enhancements for HARQ-ACK", R1-2102628, 3GPP TSG RAN WG1, e-Meeting #104bis, Apr. 12-Apr. 20, 2021, pp. 1-11.

CMCC, FL summary on support of unaligned frame boundary for R16 NR inter-band CA, R1-1911410, 3GPP TSG RAN WG1, Meeting #98bis, Chongqing, China, Oct. 14-20, 2019, pp. 1-13.

Ericsson, "HARQ-ACK Enhancements for IIOT/URLLC", R1-2007707, 3GPP TSG RAN WG1, e-Meeting #103e, Oct. 26-Nov. 13, 2020, pp. 1-11.

Intel Corporation, "Further Details on UE HARQ Feedback Enhancements", R1-2103027, 3GPP TSG RAN WG1, e-Meeting #104bis-e, Apr. 12-Apr. 20, 2021, pp. 1-13.

Interdigital, Inc., "HARQ-ACK Enhancements for IIOT and URLLC", R1-2103200, 3GPP TSG RAN WG1, e-Meeting #104b-e, Apr. 12-Apr. 20, 2021, pp. 1-6.

Lenovo, et al., "HARQ-ACK Feedback Enhancement for IIOT/URLLC", 3GPP TSG RAN WG1 #104bis-e, R1-2103610, 3rd Generation Partnership Project, Mobile Competence Centre, 650, route des lucioles, f-06921 Sophia-Antipolis Cedex, France, vol. RAN WG1, No. e-Meeting, Apr. 12, 2021-Apr. 20, 2021, 6 Pages, Apr. 7, 2021, XP052178301, p. 3-p. 4.

LG Electronics, "Discussion on UE Feedback Enhancements for HARQ-ACK", R1-2103347, 3GPP TSG RAN WG1, e-Meeting #104b-e, Apr. 12-Apr. 20, 2021, pp. 1-10.

Moderator (Ericsson), "Report on Evaluations for 5G ACIA", RP-210490, 3GPP TSG RAN WG RAN Plenary, e-Meeting #91-e, Mar. 22-26, 2020, pp. 1-39.

Moderator (Nokia): "Moderator Summary #2 on HARQ-ACK Feedback Enhancements for NR Rel-17 URLLC/IIoT", 3GPP TSG-RAN WG1 Meeting #104-e, R1-2101818, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 175 Pages, Feb. 8, 2021, XP051977624, pp. 24-35.

Moderator(Nokia)., "Final Moderator Summary on HARQ-ACK Feedback Enhancements for NR Rel-17 URLLC/IIoT", 3GPP TSG RAN WG1 Meeting #104bis-e, R1-2104039, Apr. 12-Apr. 20, 2021, pp. 1-236.

Moderator(Nokia)., "Moderator Summary #4 on HARQ-ACK Feedback Enhancements for NR Rel-17 URLLC/IIoT", 3GPP TSG RAN WG1 Meeting #105-e, R1-2106248, May 19-May 27, 2021, pp. 1-124.

NEC Corporation, "UE Feedback Enhancements for HARQ-ACK", R1-2103527, 3GPP TSG RAN WG1, e-Meeting #104b-e, Apr. 12-Apr. 20, 2021, pp. 1-13.

Nokia, et al., "HARQ-ACK Feedback Enhancements for URLLC/IIoT", 3GPP Draft, 3GPP TSG RAN WG1 #103-e, R1-2008842, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020, XP051945381, 14 Pages, p. 6, Section 2 "Dropping of SPS HARQ-ACK feedback in TDD operation", pp. 1-3, figures 2.1, 2.2 Section 6 "Retransmissions of dropped HARQ-ACK", pp. 6-8.

Nokia., et al., "3GPP Work Item Description: Enhanced Industrial Internet of Things (IoT) and URLLC Support", 3GPP TSG RAN Meeting #86, RP-193233, Sitges, Spain, Dec. 9-12, 2019, 5 pages.

NTT Docomo, Inc., "Discussion on HARQ-ACK feedback Enhancements for Rel.17 URLLC", R1-2103574, 3GPP TSG RAN WG1, e-Meeting #104b-e, Apr. 12-Apr. 20, 2021, pp. 1-11.

Qualcomm Incorporated: "HARQ-ACK Enhancement for IOT and URLLC", 3GPP TSG RAN WG1 #104bis, R1-2103163, 3rd Generation Partnership Project, Mobile Competence Centre, 650, Route Des Luciolés, F-06921 Sophia-Antipolis Cedex, France, vol. RAN WG1, No. e-Meeting, Apr. 12, 2021-Apr. 20, 2021, Apr. 7, 2021, XP052177963, 23 Pages, Section 7, Section 5—Retransmission of dropped HARQ-ACK, pp. 1, 12, 3, 18 figure 9.

Qualcomm Incorporated: "HARQ-ACK Enhancement for IOT and URLLC", 3GPP TSG RAN WG1 #105-e, R1-2104663, 3rd Generation Partnership Project, Mobile Competence Centre, 650, Route Des Luciolés, F-06921 Sophia-Antipolis Cedex France, vol. RAN WG1, No. e-Meeting, May 10, 2021-May 27, 2021, May 12, 2021, XP052010914, pp. 1-21.

Ran Chair., "Electronic Meeting RAN #92-e", 3GPP TSG RAN Meeting #92-e, RP-210980, Jun. 14-18, 2021, pp. 1-13.

Samsung "HARQ-ACK Feedback Enhancements for Rel-17 URLLC/IIOT", R1-2008159, 3GPP TSG RAN WG1, e-Meeting #103e, Oct. 26-Nov. 13, 2020, pp. 1-6.

Samsung: "On HARQ-ACK Reporting Enhancements", 3GPP TSG RAN WG1 #104b-e, R1-2103236, 3rd Generation Partnership Project (3GPP), Mobile Competence Centre, 650, Route Des Lucioles, F-06921 Sophia-Antipolis Cedex, vol. Ran WG1, No. e-Meeting, Apr. 12, 2021-Apr. 20, 2021, Apr. 7, 2021, XP052178013, p. 9, pp. 1-12.

Sony, "Considerations in HARQ-ACK Enhancements for URLLC", R1-2103300, 3GPP TSG RAN WG1, e-Meeting #104bis-e, Apr. 12-Apr. 20, 2021, pp. 1-11.

TCL Communication, "UE Feedback Enhancements for HARQ-ACK", R1-2102922, 3GPP TSG RAN WG1, e-Meeting #104bis-e, Apr. 12- Apr. 20, 2021, pp. 1-6.

Vivo, "HARQ-ACK Enhancements for Rel. 17 URLLC", R1-2102521, 3GPP TSG RAN WG1, e-Meeting #104b-e, Apr. 12-Apr. 20, 2021, pp. 1-14.

ZTE, "Discussion on HARQ-ACK Enhancements for eURLLC", R1-2008821, 3GPP TSG RAN WG1, e-Meeting #103e, Oct. 26-Nov. 13, 2020, pp. 1-10.

ZTE, "Discussion on HARQ-ACK Enhancements for eURLLC", R1-2102493, 3GPP TSG RAN WG1, e-Meeting #104b-e, Apr. 12-Apr. 20, 2021, pp. 1-21.

* cited by examiner

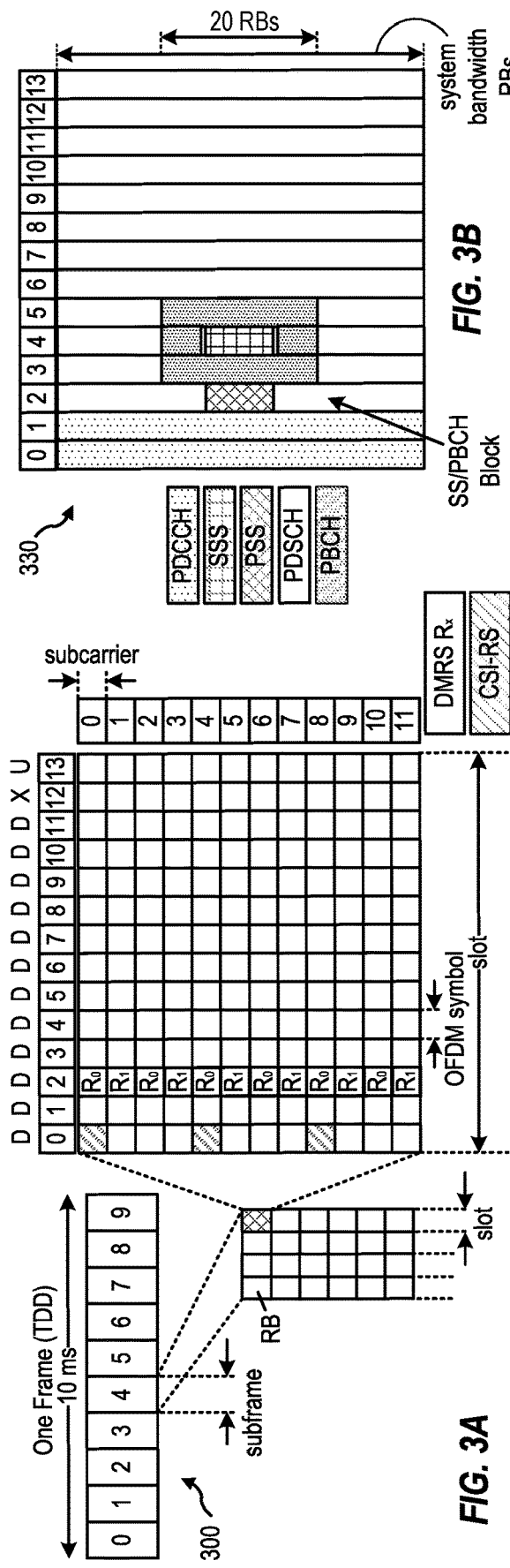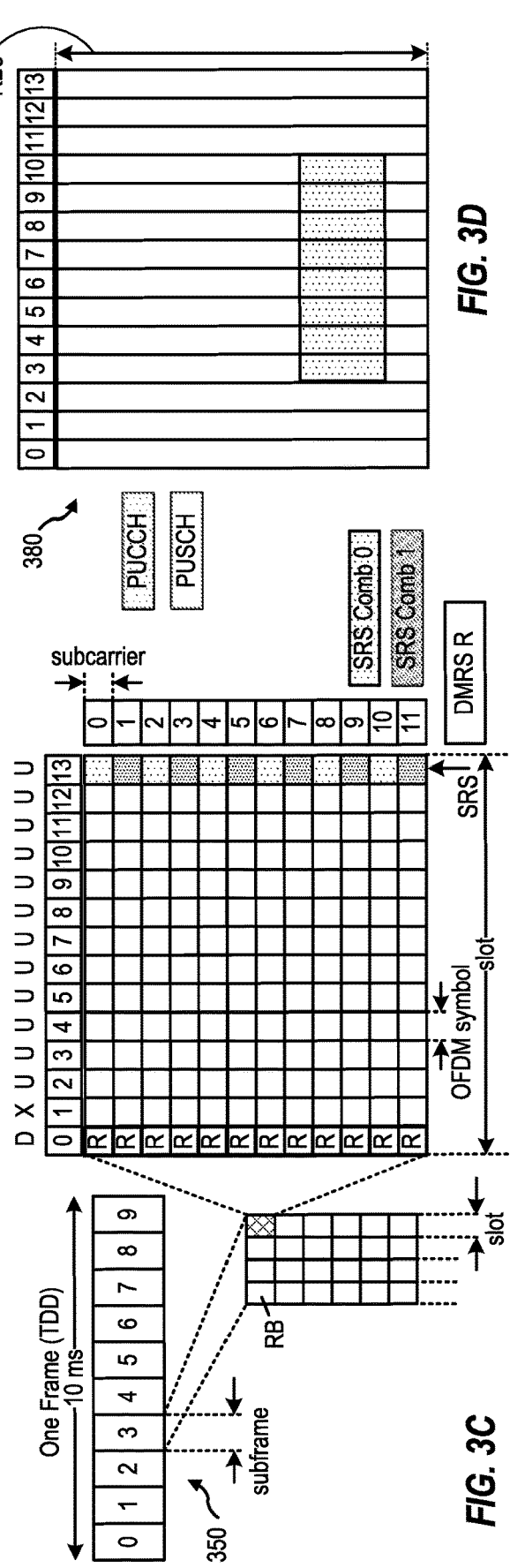

PHYSICAL UPLINK CONTROL CHANNEL (PUCCH) RESOURCE IDENTIFICATION FOR DEFERRED TRANSMISSION OF ACKNOWLEDGMENT FEEDBACK

CROSS-REFERENCE TO RELATED APPLICATIONS

This application claims priority to and benefit of U.S. Provisional Patent Application Ser. No. 63/234,960, entitled "Physical Uplink Control Channel (PUCCH) Resource Identification for Deferred Transmission of Acknowledgment Feedback," filed Aug. 19, 2021, and U.S. Provisional Patent Application Ser. No. 63/235,128, entitled "Flexible Symbol Resources for Deferred Transmission of Acknowledgment Feedback," filed Aug. 19, 2021, both of which are assigned to the assignee hereof, the contents of both of which are hereby incorporated by reference in its entirety.

INTRODUCTION

Aspects of the present disclosure relate to wireless communications, and more particularly, to techniques for identifying resources for use in deferred transmission of acknowledgment/negative acknowledgment (ACK/NACK) feedback.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes monitoring for a semi-persistently scheduled (SPS) physical downlink shared channel (PDSCH); determining that a first resource, identified by a first physical uplink control channel (PUCCH) resource identifier (PRI), for transmitting a physical uplink control channel (PUCCH) with acknowledgment feedback for the SPS PDSCH collides with a downlink resource; identifying a second resource for transmitting the PUCCH based on parameters associated with the first PRI or a second PRI; and transmitting the PUCCH on the second resource.

In one aspect, a method for wireless communications by a network entity includes transmitting a SPS PDSCH to a UE; determining that a first resource, identified by a first PRI, for receiving a PUCCH from the UE with acknowledgment feedback for the SPS PDSCH collides with a downlink resource; identifying a second resource for transmitting the PUCCH based on parameters associated with the first PRI or a second PRI; and monitoring for the PUCCH on the second resource.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for identifying resources for use in deferred transmission of acknowledgment/negative acknowledgment (ACK/NACK) feedback.

In wireless communications systems, user equipments (UEs) may be configured to provide ACK or NACK feedback to a network entity to indicate whether a transmission by the network entity was successfully or unsuccessfully received. This feedback is generally used by the network entity to determine whether transmissions are to be retried. When an ACK is received, the network entity can determine that the transmission was successfully received by the UE. When a NACK is received, or when no feedback is received at an expected time, the network entity can determine that the transmission was not successfully received by the UE and can perform a retransmission. However, in some cases, resources that would typically be used by a UE to transmit ACK or NACK feedback may conflict with resources defined as downlink resources. Because these resources are defined as downlink resources, the UE may not use these resources to transmit the ACK or NACK feedback.

Aspects of the present disclosure allow for deferred transmission of ACK or NACK feedback based on various parameters associated with resources on which ACK or NACK feedback can be transmitted. Generally, when a resource identified as a resource for transmitting ACK or NACK feedback collides with a downlink resource, another resource can be used to transmit the ACK or NACK feedback to the network entity.

By allowing for deferred transmission of ACK or NACK feedback, aspects of the present disclosure may allow for ACK or NACK feedback to be provided to a network entity in situations where an identified resource on which this ACK or NACK feedback was to be transmitted collides with downlink resources. The latency involved in providing ACK or NACK feedback to the network entity may be reduced relative to techniques that attempt to transmit on the identified resource in another time period (e.g., on a same symbol in a different slot).

Introduction to Wireless Communication Networks

Figure 1:
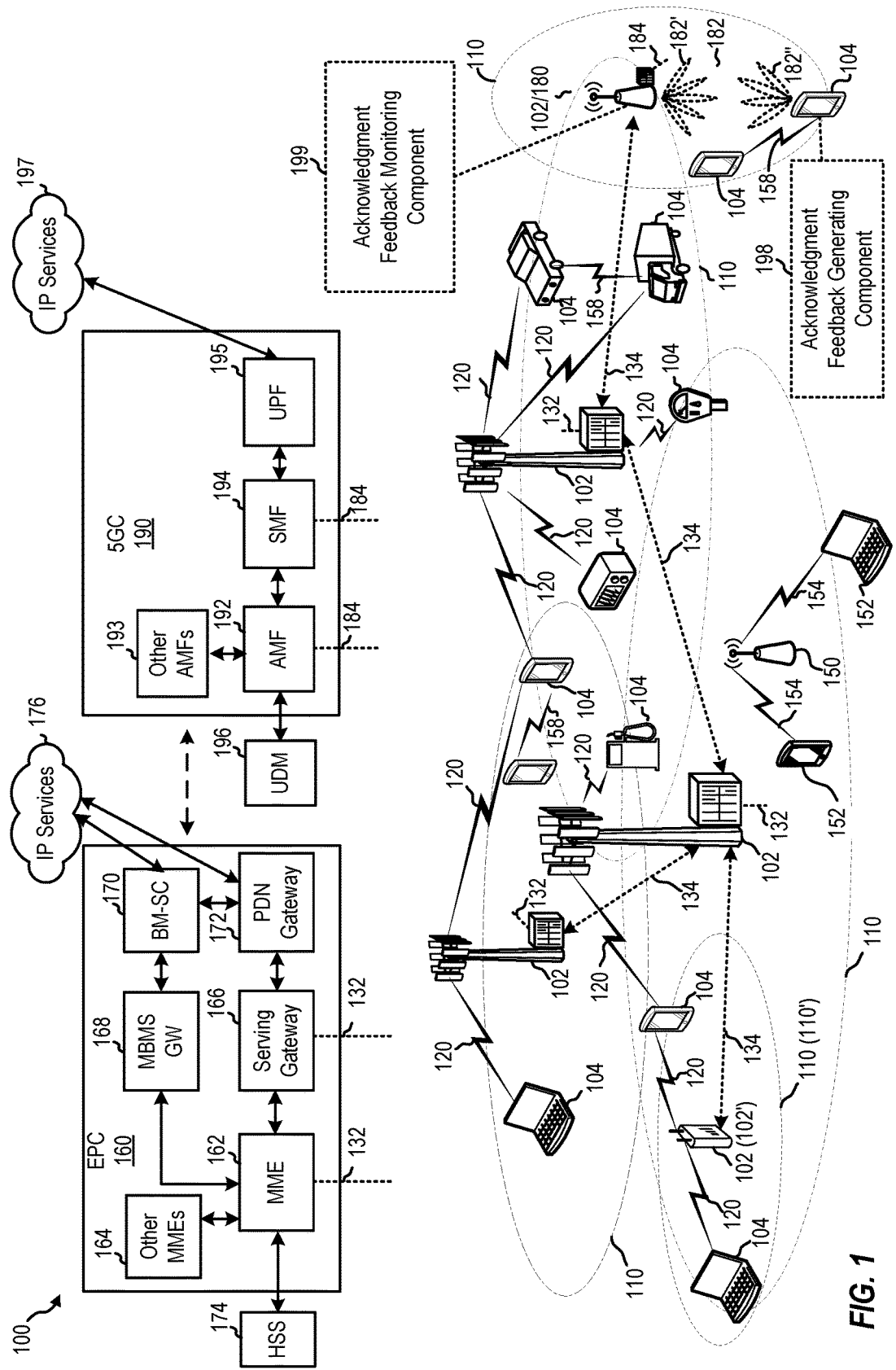
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes acknowledgment feedback monitoring component 199, which may be configured to monitor for acknowledgment feedback from a UE. Wireless network 100 further includes acknowledgment feedback generating component 198, which may be configured to identify a resource on which acknowledgment feedback is to be transmitted and transmit the acknowledgment feedback on the identified resource.

Figure 2:
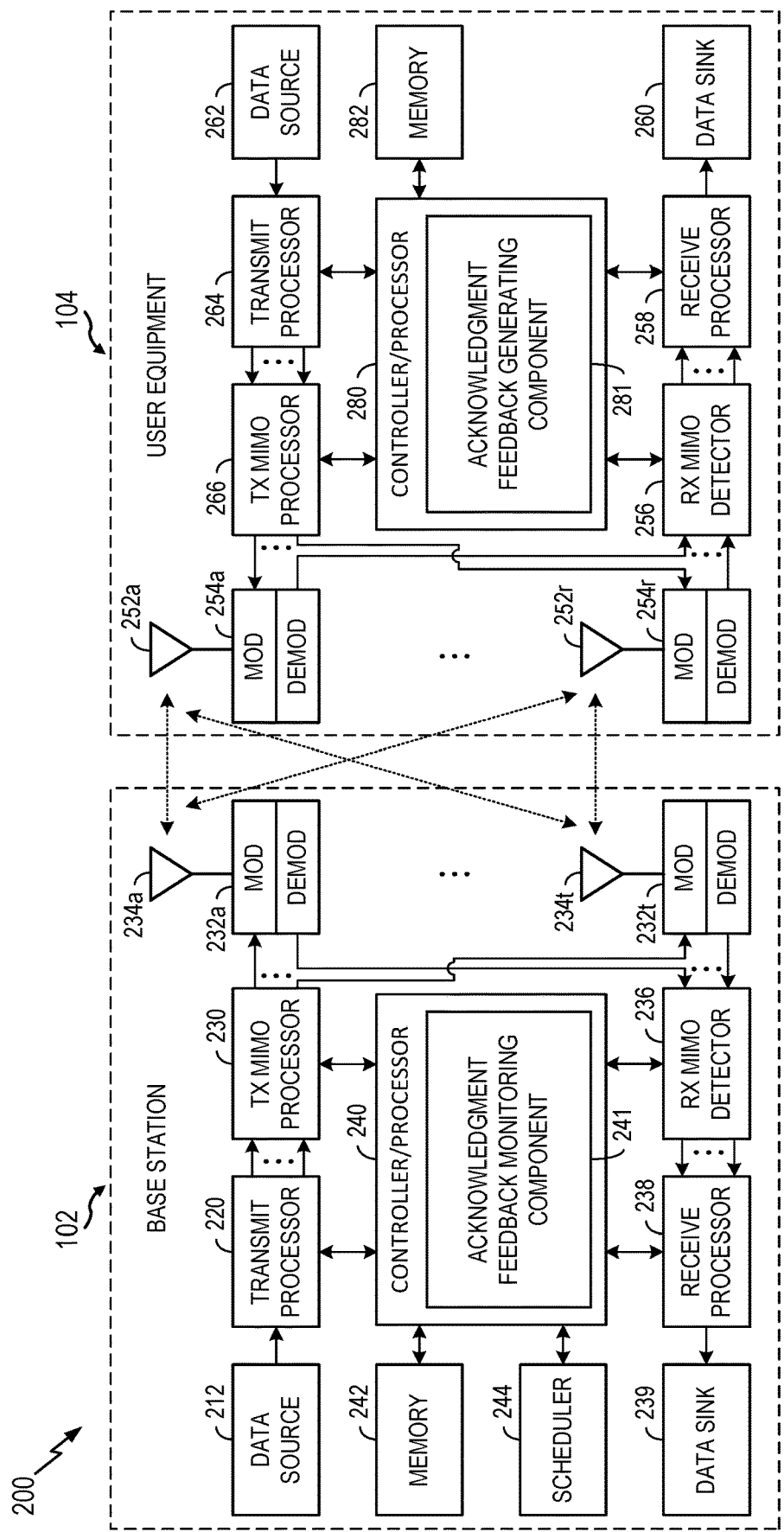
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes acknowledgment feedback monitoring component 241, which may be representative of acknowledgment feedback monitoring component 199 of FIG. 1. Notably, while depicted as an aspect of controller/processor 240, acknowledgment feedback monitoring component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes acknowledgment feedback generating component 281, which may be representative of acknowledgment feedback generating component 198 of FIG. 1. Notably, while depicted as an aspect of controller/processor 280, acknowledgment feedback generating component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHZ-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to Identifying Resources for Use in Deferred Transmission of Acknowledgment Feedback In wireless communications systems, a UE is generally configured to transmit acknowledgment (ACK) or negative acknowledgment (NACK) feedback to a network entity in response to a downlink transmission by the network entity. However, in various cases, the resource(s) on which the UE is scheduled to transmit ACK or NACK feedback may not be available for use in performing uplink transmissions. For example, a given resource on which the UE may be scheduled to transmit ACK or NACK feedback may actually be defined as a downlink resource in which a network entity is scheduled to transmit data to the UE. Because this resource is a downlink resource and not an uplink resource, the UE may not be able to transmit ACK or NACK feedback to the network entity in this resource.

Figure 4:
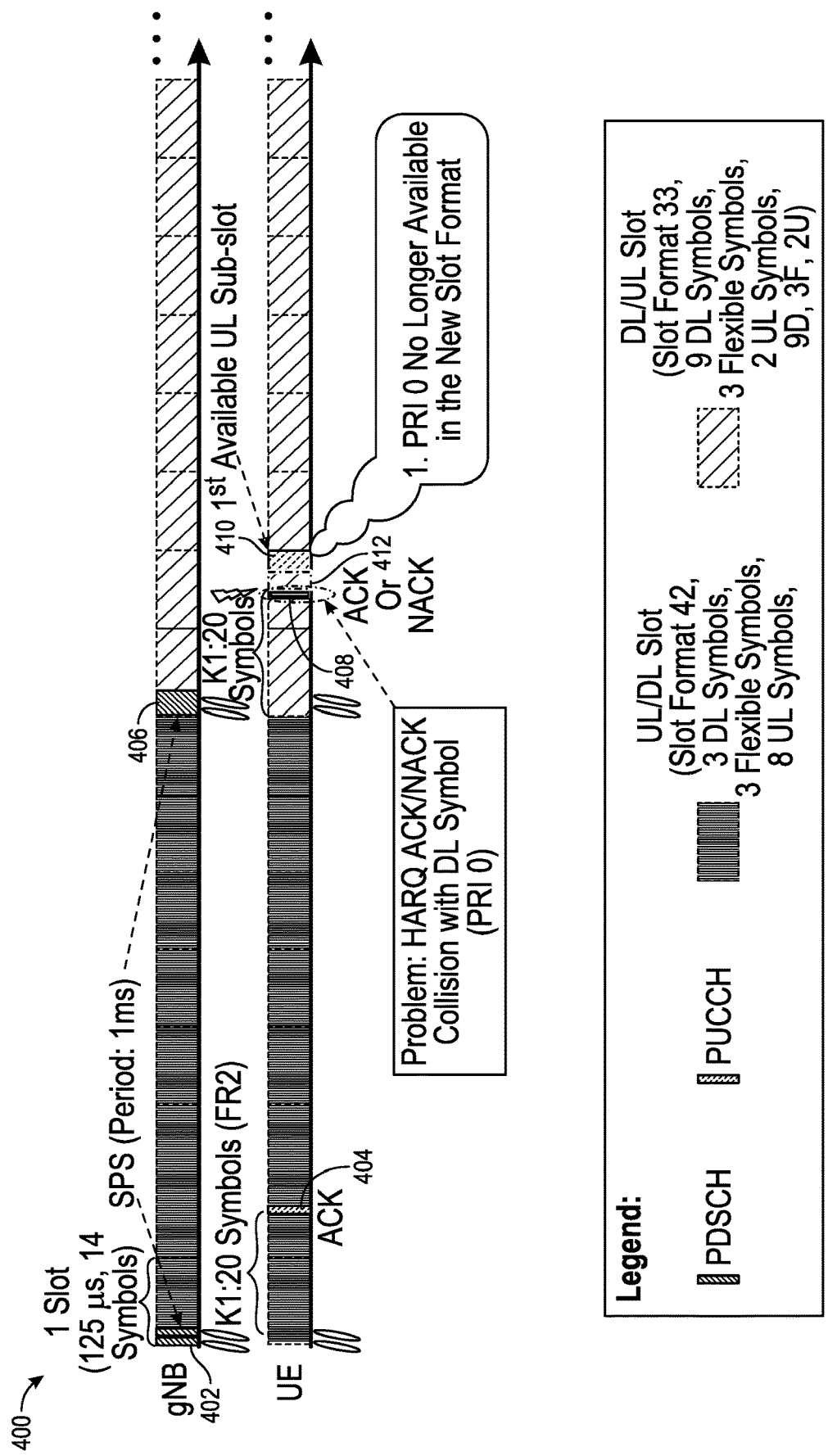
FIG. 4 depicts a collision between a scheduled uplink resource for transmission of acknowledgment feedback and a downlink symbol.

FIG. 4 depicts a collision 400 between a scheduled uplink resource for transmission of acknowledgment feedback and a downlink symbol. In this example, the network entity and UE may be operating in FR2, an operating region in which a slot may be defined as including 14 symbols and having a duration of 125 microseconds. The network entity may semi-persistently schedule the UE with a periodicity of one millisecond. As illustrated, feedback may be scheduled to be transmitted by the UE 20 symbols after a semi-persistently scheduled (SPS) downlink transmission (e.g., on a physical downlink shared channel, PDSCH) is performed.

As illustrated, when operations transition from one slot format to another slot format, the SPS downlink transmission 402 and 406 (e.g., PDSCH transmission) may still trigger the UE to provide feedback 20 symbols after the SPS downlink transmission at symbols 404 and 408. However, as illustrated, in some cases, symbol 408 may collide with a downlink symbol. As discussed, because symbol 408 is a downlink symbol, the UE may not be able to transmit the ACK or NACK feedback on this symbol. Thus, transmission of the ACK or NACK feedback may be deferred to a symbol in which an uplink transmission can be performed. In some aspects, the transmission of the ACK or NACK feedback may be deferred to a first available resource 410 on which a physical uplink control channel (PUCCH) can be transmitted. In another aspect, transmission of the ACK or NACK feedback may be deferred to a flexible symbol resource 412 in which uplink or downlink transmissions may be performed.

Generally, the SPS downlink transmission may include a PUCCH resource identifier (PRI) defining properties of hybrid automatic repeat request (HARQ) ACK/NACK feedback provided by the UE in response to the SPS downlink transmission. The PRI may include, for example, an identification of a PUCCH format, a cyclic shift, a payload size for the HARQ ACK/NACK feedback (e.g., in terms of a number of symbols), and a starting symbol index identifying the symbol in which HARQ ACK/NACK feedback should be transmitted. In one example, PRI 0 may specify that the ACK/NACK feedback is to be transmitted using PUCCH format 0, and cyclic shift 5, that the payload comprises a single symbol, and that the feedback is to be transmitted beginning at symbol index 7 (e.g., in the eighth symbol in a slot, where symbols are indexed from 0 through n-1 for an n symbol-sized slot). Generally, the PRIs may be defined relative to a number of PUCCH resource sets having different indices. For example, PRIs may be assigned to PUCCH resource sets according to the following table:

| PUCCH Resource Set 0 | PUCCH Resource Set 1 | PUCCH Resource Set 2 | PUCCH Resource Set 0 |
|---|---|---|---|
| PRI 0 | PRI 1 | PRI 2 | PRI 3 |

As new slot formats are introduced, with different arrangements of uplink, downlink, and flexible symbols, symbols identified in a PRI for ACK/NACK feedback may no longer be available for use in transmitting ACK/NACK feedback (or performing any other uplink transmissions). In some aspects, to transmit the ACK/NACK feedback, the UE may use a different PRI, or at least a resource identified in another PRI. For example, assume that an SPS PDSCH transmission schedules an uplink transmission based on PRI 0. Other PRIs (e.g., PRIs 1 through 3, illustrated in the table above) may be defined with the same payload size for ACK/NACK feedback (e.g., one symbol of feedback, but on a different resource), and thus, these PRIs may be used to define at least a symbol on which the ACK/NACK feedback is to be transmitted (and, potentially, other parameters of the ACK/NACK feedback). In some cases, however, multiple PRIs may be defined with the same payload size for ACK/NACK feedback as the PRI specified in an SPS PDSCH transmission, and thus, there may be some ambiguity in defining, by the UE, which PRI is to be applied in transmitting ACK/NACK feedback (and correspondingly, in determining, by a network entity, which resource(s) to monitor for ACK/NACK feedback when a conflict exists between the symbol(s) identified in a PRI and the symbol(s) defined in a particular slot format).

In some aspects, to transmit the ACK/NACK feedback, the UE may use a different symbol. Generally, the UE may not perform any uplink transmissions on symbols designated in a slot format as a downlink symbol. The UE, however, may perform uplink transmissions on symbols designated in the slot format as uplink symbols or, in some aspects, flexible symbols.

Aspects of the present disclosure provide various techniques for identifying resources on which ACK/NACK feedback is to be carried. As discussed in further detail, these resources on which ACK/NACK feedback is to be carried may be identified when a conflict exists between a resource for ACK/NACK feedback identified by a PRI and the symbol format of a slot in which the ACK/NACK feedback is to be provided or may be identified based on the presence of flexible symbols in a slot.

Figure 5:
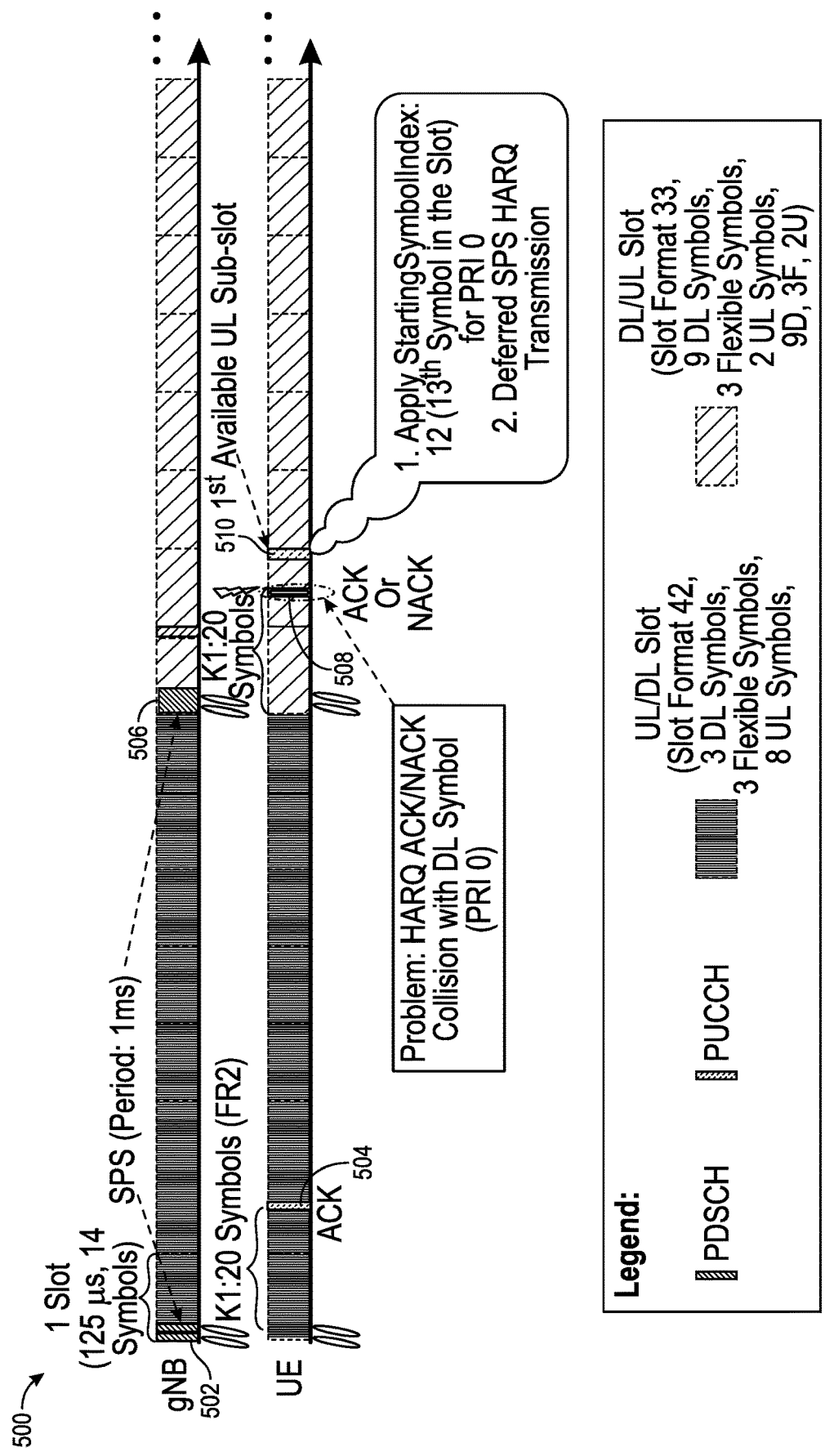
FIG. 5 depicts an example of deferring acknowledgment feedback to another symbol when a scheduled uplink resource for transmission of acknowledgment feedback and a downlink symbol collide.

FIG. 5 depicts an example 500 of deferring acknowledgment feedback to another symbol when a scheduled uplink resource for transmission of acknowledgment feedback and a downlink symbol collide. As illustrated, in a first slot format, an SPS downlink transmission 502 may trigger transmission of ACK/NACK feedback 504 in a symbol that is designated as an uplink symbol. However, in a second slot format, a symbol 508 in which ACK/NACK feedback is triggered for an SPS transmission 506 may collide with a downlink symbol. Thus, a different starting symbol index may be selected for use in transmitting the ACK/NACK feedback to the network entity. In this example, the starting symbol index selected for the symbol 510 to use in transmitting the ACK/NACK feedback may be the first available uplink symbol(s) (e.g., the earliest available symbol) in the slot, as defined by a slot format defining the arrangement of uplink, downlink, and flexible symbols in the slot in which the ACK/NACK feedback is scheduled.

In some aspects, the ACK/NACK feedback may use other parameters defined for the PRI identified in the SPS PDSCH transmission. For example, assume that the SPS PDSCH transmission specifies that PRI 0 defines the format of ACK/NACK feedback provided by the UE (e.g., as discussed above, that the ACK/NACK feedback is to be transmitted using PUCCH format 0, and cyclic shift 5, that the payload comprises a single symbol, and that the feedback is to be transmitted beginning at starting symbol index 7). The starting symbol index in the PRI identified in the SPS PDSCH transmission may be ignored, and, as illustrated, ACK/NACK feedback may be deferred to symbol index 12 in the slot (e.g., transmitted in the 13th symbol of the slot). The ACK/NACK feedback may still be transmitted using PUCCH format 0, cyclic shift 5, and in a single symbol payload.

FIG. 5 illustrates an example of intra-slot deferral, in which the ACK/NACK feedback is transmitted in a same slot as originally scheduled. However, situations may arise in which an uplink symbol is not available in the slot in which the ACK/NACK feedback is originally scheduled (e.g., where the starting symbol index identified in a PRI identifies a symbol that is located after the last uplink symbol in a slot). To determine which resource(s) are to be used to transmit ACK/NACK feedback, various other techniques may be used.

In one example, other PRIs may be examined to identify PRIs that carry the same sized ACK/NACK payload as the PRI specified in the SPS PDSCH transmission. If only one PRI is identified as specifying the same size of an ACK/NACK payload as the PRI specified in the SPS PDSCH transmission, the parameters included in the identified PRI may be used for transmission of ACK/NACK feedback.

In some aspects, multiple PRIs may specify the same size of the ACK/NACK payload as the PRI specified in the SPS PDSCH transmission. In such a case, any one of these multiple PRIs may be selected, leading to some ambiguity in determining the parameters of an ACK/NACK feedback transmission. To resolve this ambiguity, various rules may be defined for selecting the PRI based on the PRI index or an index of the PUCCH resource set including these PRIs. If the multiple PRIs are included in a same PUCCH resource set, the PRI having the lowest index may be selected for use in transmitting the ACK/NACK feedback. For example, assume that the SPS PDSCH specifies PRI 0 for the ACK/NACK feedback, the resource specified by PRI 0 is not available for use, and PRIs 1 and 2 are determined to be available for use in transmitting the ACK/NACK feedback (i.e., PRIs 1 and 2 specify symbol indices that are uplink symbols according to a slot format definition and have the same payload size as PRI 0). In this case, PRI 1 may be used for the transmission of ACK/NACK feedback by the UE to a network entity.

In some cases, the multiple PRIs may be included in different PUCCH resource sets. In this case, the index of the PUCCH resource sets to which each of the multiple PRIs belong may be used to select the PRI to use for ACK/NACK feedback. For example, the selected PRI may be from the PUCCH resource set having the lowest index. As an illustrative example and using the table above, suppose the SPS PDSCH specifies PRI 0 for the ACK/NACK feedback, and it is determined that PRIs 2 and 3 can be used for transmission of the ACK/NACK feedback (i.e., that these PRIs support the same sized payload as PRI 0). PRI 2 may be selected for the ACK/NACK feedback, since PRI 2 is from PUCCH resource set 2, while PRI 3 is from PUCCH resource set 3.

Figure 6:
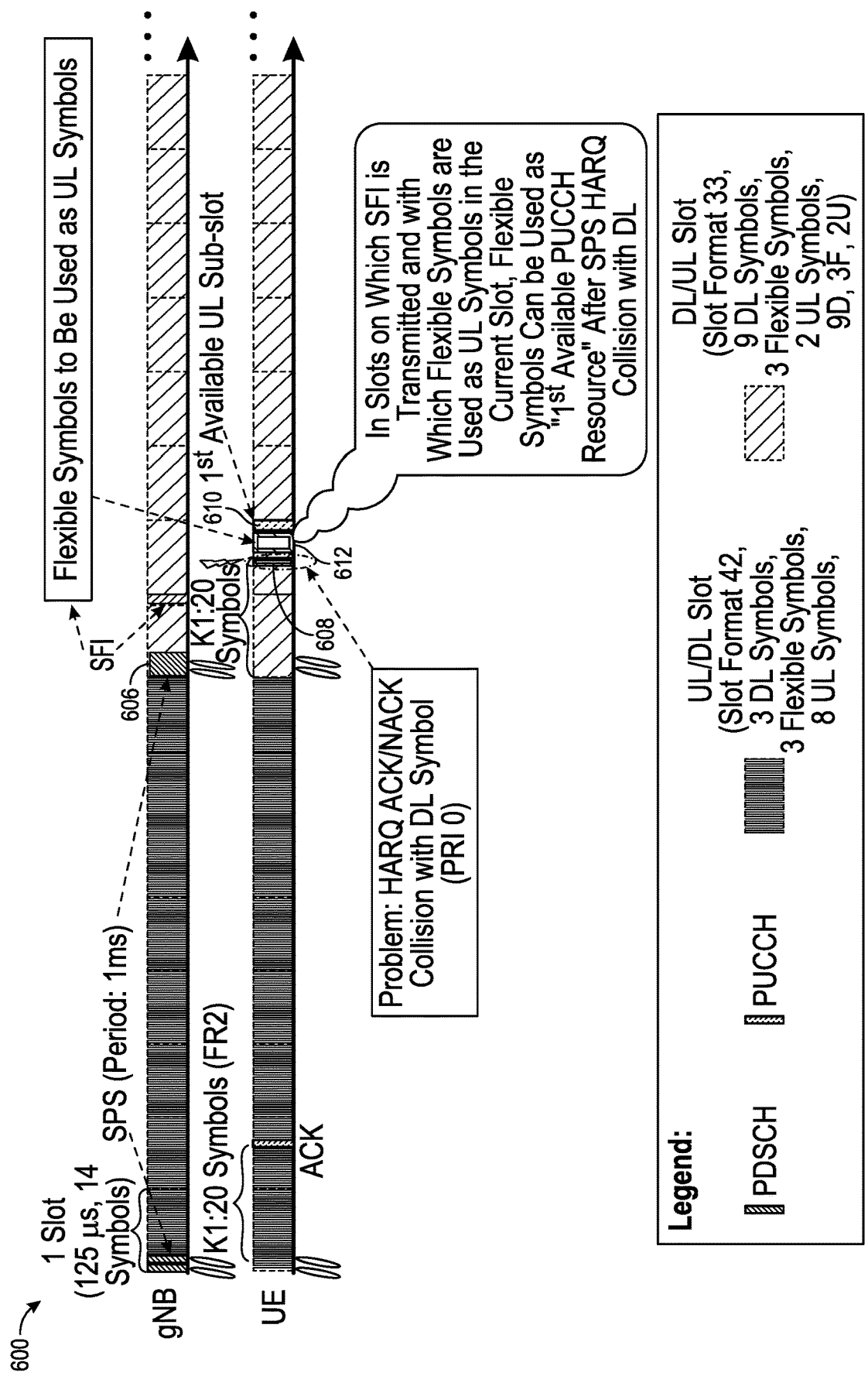
FIG. 6 depicts an example of deferring acknowledgment feedback to a flexible symbol when a scheduled uplink resource for transmission of acknowledgment feedback and a downlink symbol collide.

FIG. 6 depicts an example 600 of deferring acknowledgment feedback to another symbol when a scheduled uplink resource for transmission of acknowledgment feedback and a downlink symbol collide. In example 600, when the ACK/NACK feedback for an SPS PDSCH transmission 606 is scheduled for a symbol 608 which is designated as a downlink symbol in a given slot format, a different starting symbol index may be selected for use in transmitting the ACK/NACK feedback to the network entity. In this example, the starting symbol index selected for the symbol to use in transmitting the ACK/NACK feedback may be the first available symbol(s) (e.g., the earliest available symbol) in the slot, as defined by a slot format defining the arrangement of uplink, downlink, and flexible symbols in the slot in which the ACK/NACK feedback is scheduled. The first available symbol may be selected from the uplink symbols, such as symbol 610 illustrated in FIG. 6, in the slot in which the ACK/NACK feedback is scheduled for transmission, or from the flexible symbols 612 and uplink symbols (including symbol 610) in the slot in which the ACK/NACK feedback is scheduled for transmission.

Various conditions may determine whether a UE can consider flexible symbols 612 within a slot as candidates for transmission of deferred ACK/NACK feedback. In some aspects, one of these conditions may be defined as a positive detection of a particular indication transmitted by a network entity. This indication may include, for example, a slot format indicator (SFI) carried in downlink control information signaling (e.g., in DCI format 2_0). If the indication is successfully decoded, flexible symbols in the slot definition may be considered an available resource for use in transmitting ACK/NACK feedback to a network entity (e.g., may be considered as an uplink resource for purposes of determining which resource(s) to use in transmitting the ACK/NACK feedback). If, however, the indication is not decoded successfully or otherwise lost in transmission from the network entity, the UE can determine that the flexible symbols identified in the slot definition are unavailable for use in transmitting ACK/NACK feedback and thus can select a resource for transmitting the ACK/NACK feedback from the set of uplink symbols identified in the slot definition.

Generally, because the slot format is known to both the network entity and the UE, the network entity may be configured to listen for ACK/NACK feedback on flexible symbols 612 and uplink symbols, including symbol 610. If the network entity does not detect ACK/NACK feedback on a flexible symbol 612, the network entity may determine that the UE was unable to successfully decode the indication (e.g., the SFI carried in DCI signaling) and thus may determine that ACK/NACK feedback will be transmitted by the UE on an uplink symbol in the slot. Thus, the network entity can monitor for ACK/NACK feedback on uplink symbols in the slot, but need not monitor for ACK/NACK feedback on subsequent flexible symbols in the slot.

In another example, the conditions for determining whether to include flexible symbols 612 as candidate symbols for transmission of ACK/NACK feedback may include whether a request is received from a network entity indicating that flexible symbols are not to be considered as candidate symbols. The network entity may transmit a request to the UE to not consider flexible symbols as candidate symbols, for example, if the network entity determines that an uplink traffic load is less than a threshold traffic load. Because uplink traffic load is less than a threshold traffic load, the network entity can determine that uplink resources are available for transmission of deferred ACK/NACK feedback and can thus determine that flexible symbols need not be used for transmission of deferred ACK/NACK feedback.

In another example, the network entity can request that the UE not consider flexible symbols 612 as candidate symbols based on the number of available uplink symbols in the slot. In such a case, if the number of uplink symbols in the slot exceeds a threshold number of symbols, the network entity can similarly determine that flexible symbols 612 need not be used for transmission of deferred ACK/NACK feedback. The request may be carried, for example, in downlink control information (DCI) signaling, in a medium access control (MAC) control element (CE), or via radio resource control (RRC) signaling. In some aspects, the request may be included in system information broadcast by the network entity.

In some aspects, the UE may determine whether flexible symbols are to be considered as candidate symbols for deferred ACK/NACK feedback. If the UE determines that the number of available uplink symbols in the slot exceeds a threshold number of symbols, the UE can transmit a request to the network entity for the network entity to not consider flexible symbols as candidate symbols for deferred ACK/NACK feedback. The request may be transmitted, for example, via a scheduling request (SR) message, in a MAC CE, or in RRC signaling.

Example Methods

Figure 7:
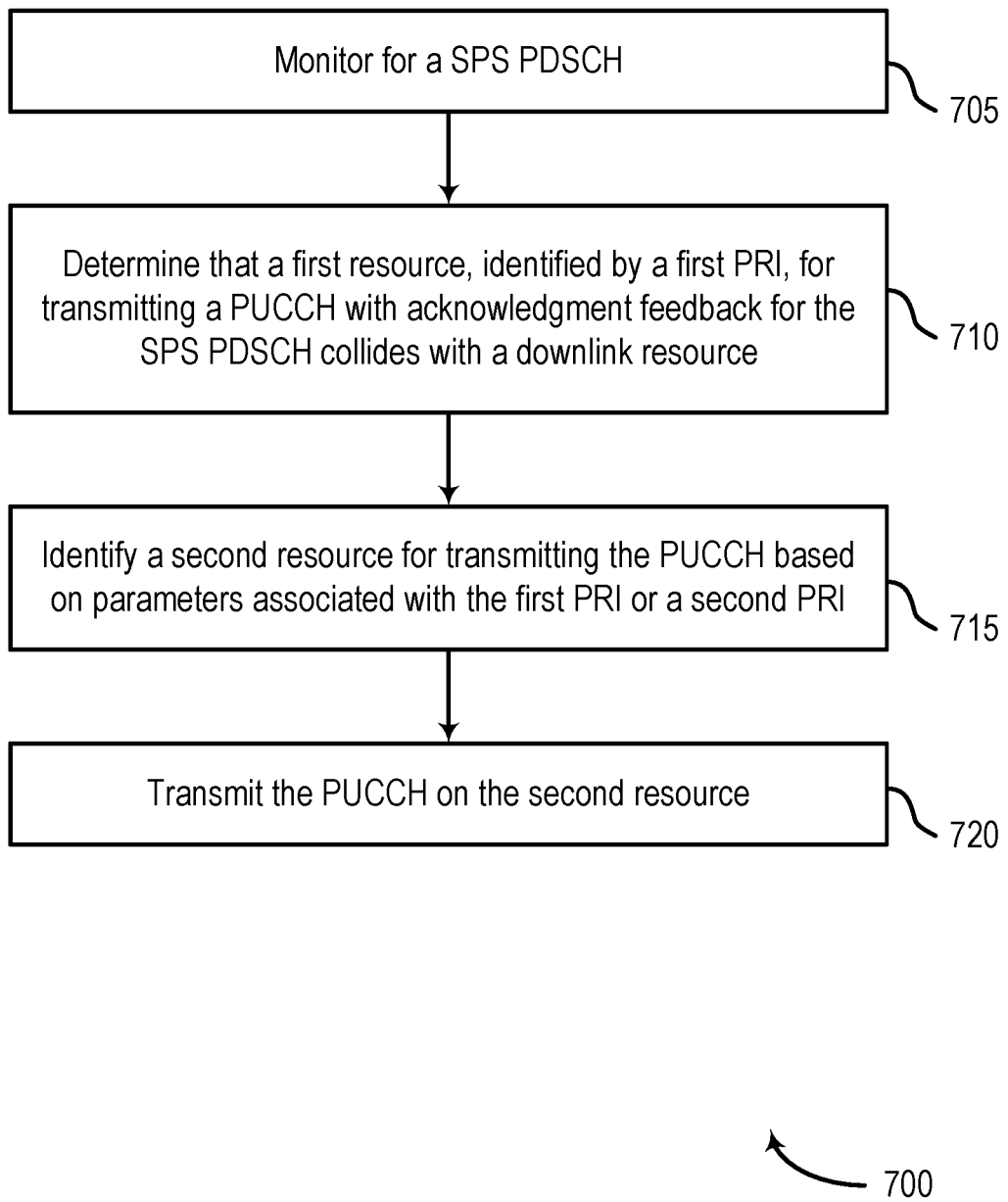
FIGS. 7 and 8 show example methods for physical uplink control channel (PUCCH) resource identification based on parameters associated with PUCCH resource identifiers (PRIs) according to aspects of the present disclosure.

FIG. 7 shows an example of a method 700 for PUCCH resource identification based on parameters associated with PRIs according to aspects of the present disclosure. In some aspects, a user equipment, such as UE 104 of FIGS. 1 and 2, or processing system 1105 of FIG. 11, may perform the method 700.

At operation 705, the system monitors for a SPS PDSCH. In some cases, the operations of this step refer to, or may be performed by, PDSCH reception circuitry as described with reference to FIG. 11.

At operation 710, the system determines that a first resource, identified by a first PRI, for transmitting a PUCCH with acknowledgment feedback for the SPS PDSCH collides with a downlink resource. In some cases, the operations of this step refer to, or may be performed by, resource management circuitry as described with reference to FIG. 11.

At operation 715, the system identifies a second resource for transmitting the PUCCH based on parameters associated with the first PRI or a second PRI. In some cases, the operations of this step refer to, or may be performed by, resource management circuitry as described with reference to FIG. 11.

At operation 720, the system transmits the PUCCH on the second resource. In some cases, the operations of this step refer to, or may be performed by, PUCCH transmission circuitry as described with reference to FIG. 11.

In some aspects, the second resource comprises one or more symbols in a same slot as one or more symbols of the first resource. In some aspects, the second resource comprises an earliest available symbol in the same slot.

In some aspects, the second resource is identified based on the second PRI. In some aspects, the second PRI is associated with a same UCI payload as the first PRI. In some aspects, the second PRI and at least a third PRI are both associated with a same UCI payload as the first PRI; the second PRI and the third PRI are both in a same PUCCH resource set; and the second PRI is selected based on the second PRI having a lower PRI index than the third PRI. In some aspects, the second PRI and at least a third PRI are both associated with a same UCI payload as the first PRI; the second PRI is from a first PUCCH resource set and the third PRI is from a second PUCCH resource set; and the second PRI is selected based on the first PUCCH resource set having a lower PUCCH resource set index than the second PUCCH resource set.

Figure 8:
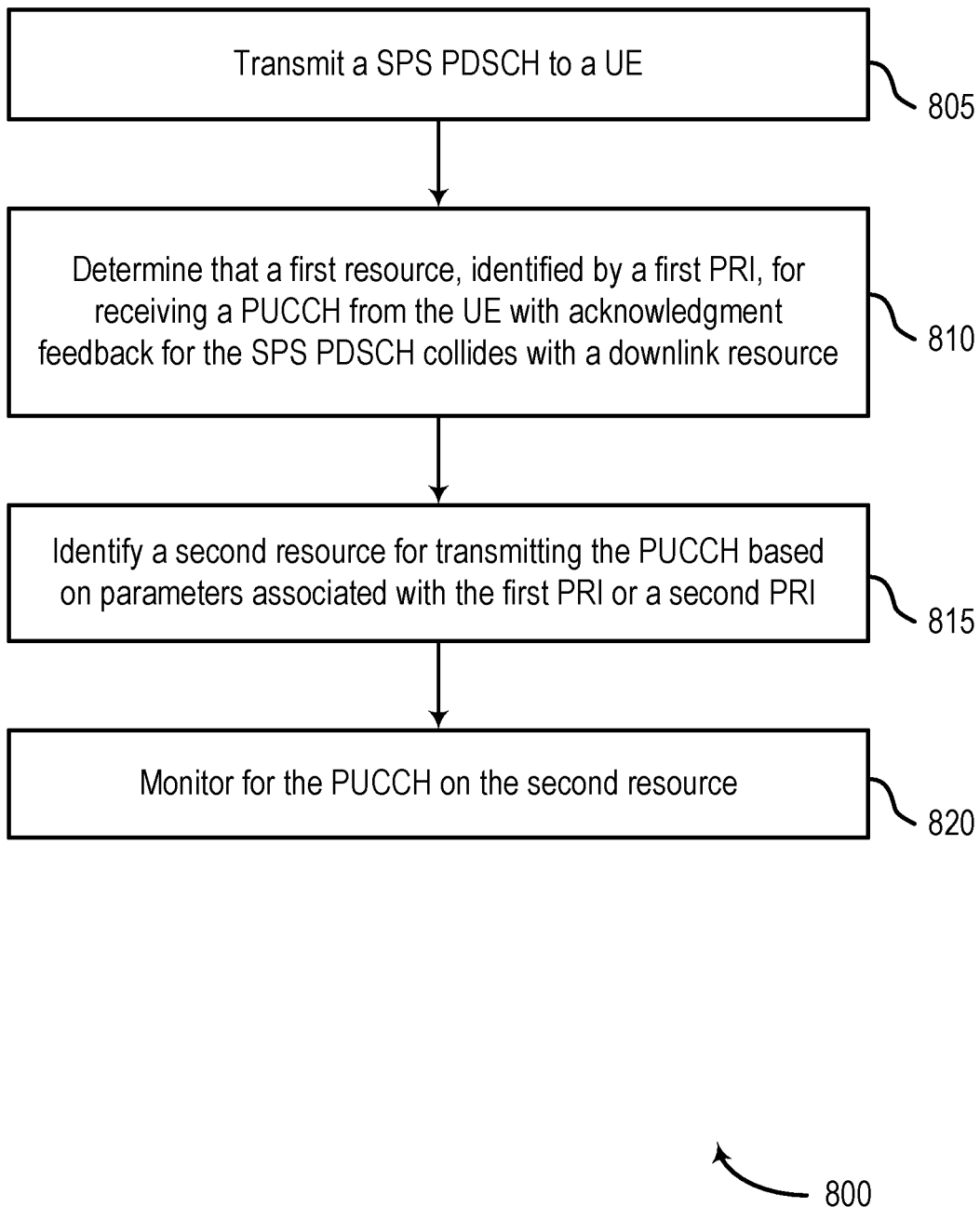

FIG. 8 shows an example of a method 800 for PUCCH resource identification based on parameters associated with PRIs according to aspects of the present disclosure. In some aspects, a base station, such as base station 102 of FIGS. 1 and 2, or processing system 1205 of FIG. 12, may perform the method 1200.

At operation 805, the system transmits a SPS PDSCH to a UE. In some cases, the operations of this step refer to, or may be performed by, PDSCH transmission circuitry as described with reference to FIG. 12.

At operation 810, the system determines that a first resource, identified by a first PRI, for receiving a PUCCH from the UE with acknowledgment feedback for the SPS PDSCH collides with a downlink resource. In some cases, the operations of this step refer to, or may be performed by, resource management circuitry as described with reference to FIG. 12.

At operation 815, the system identifies a second resource for transmitting the PUCCH based on parameters associated with the first PRI or a second PRI. In some cases, the operations of this step refer to, or may be performed by, resource management circuitry as described with reference to FIG. 12.

At operation 820, the system monitors for the PUCCH on the second resource. In some cases, the operations of this step refer to, or may be performed by, PUCCH reception circuitry as described with reference to FIG. 12.

In some aspects, the second resource comprises one or more symbols in a same slot as one or more symbols of the first resource. In some aspects, the second resource comprises an earliest available symbol in the same slot.

In some aspects, the second resource is identified based on the second PRI. In some aspects, the second PRI is associated with a same UCI payload as the first PRI. In some aspects, the second PRI and at least a third PRI are both associated with a same UCI payload as the first PRI; the second PRI and the third PRI are both in a same PUCCH resource set; and the second PRI is selected based on the second PRI having a lower PRI index than the third PRI. In some aspects, the second PRI and at least a third PRI are both associated with a same UCI payload as the first PRI; the second PRI is from a first PUCCH resource set and the third PRI is from a second PUCCH resource set; and the second PRI is selected based on the first PUCCH resource set having a lower PUCCH resource set index than the second PUCCH resource set.

Figure 9:
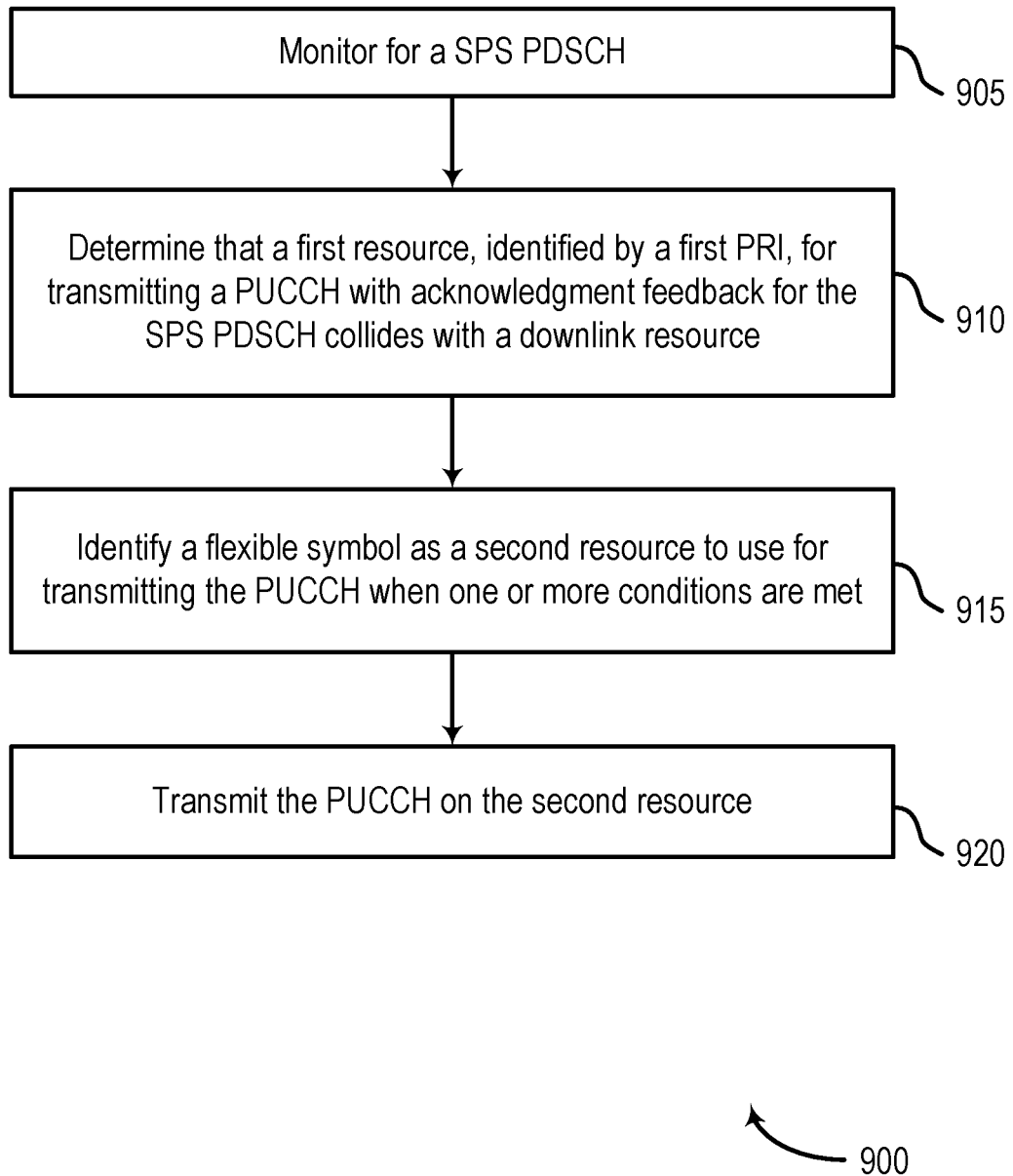
FIGS. 9 and 10 show example methods for management of flexible symbol resources for physical uplink control channel (PUCCH) according to aspects of the present disclosure.

FIG. 9 shows an example of a method 900 for management of flexible symbol resources for PUCCH according to aspects of the present disclosure. In some aspects, a user equipment, such as UE 104 of FIGS. 1 and 2, or processing system 1105 of FIG. 11, may perform the method 900.

At operation 905, the system monitors for a SPS PDSCH. In some cases, the operations of this step refer to, or may be performed by, PDSCH reception circuitry as described with reference to FIG. 11.

At operation 910, the system determines that a first resource, identified by a first PRI, for transmitting a PUCCH with acknowledgment feedback for the SPS PDSCH collides with a downlink resource. In some cases, the operations of this step refer to, or may be performed by, resource management circuitry as described with reference to FIG. 11.

At operation 915, the system identifies a flexible symbol as a second resource to use for transmitting the PUCCH when one or more conditions are met. In some cases, the operations of this step refer to, or may be performed by, resource management circuitry as described with reference to FIG. 11.

At operation 920, the system transmits the PUCCH on the second resource. In some cases, the operations of this step refer to, or may be performed by, PUCCH transmission circuitry as described with reference to FIG. 11.

In some aspects, the one or more conditions comprise a condition where the second resource comprises a resource located in a same slot as a slot in which a SFI is received, a condition where the second resource is selected from one or more flexible symbols indicated as uplink symbols in the SFI, or both. In some aspects, the second resource comprises an earliest available symbol of the group of flexible symbols and uplink symbols identified in the SFI.

In some aspects, method 900 includes receiving a request that the flexible symbols are not to be considered as candidates for deferred PUCCH transmission after detecting a collision between a PUCCH resource identified by a PRI with a downlink resource. In some aspects, method 900 includes avoiding selecting flexible symbols for deferred PUCCH transmission based on the request. In some aspects, the request is received via at least one of: a DCI, a MAC CE, RRC signaling, or system information.

In some aspects, method 900 includes sending a request for flexible symbols to not be considered as candidates for deferred PUCCH transmission after detecting a collision between a PUCCH resource identified by a PRI with a downlink resource based on a number of available uplink symbols in a slot. In some aspects, the request is sent via at least one of: a SR, a MAC CE, or RRC signaling.

Figure 10:
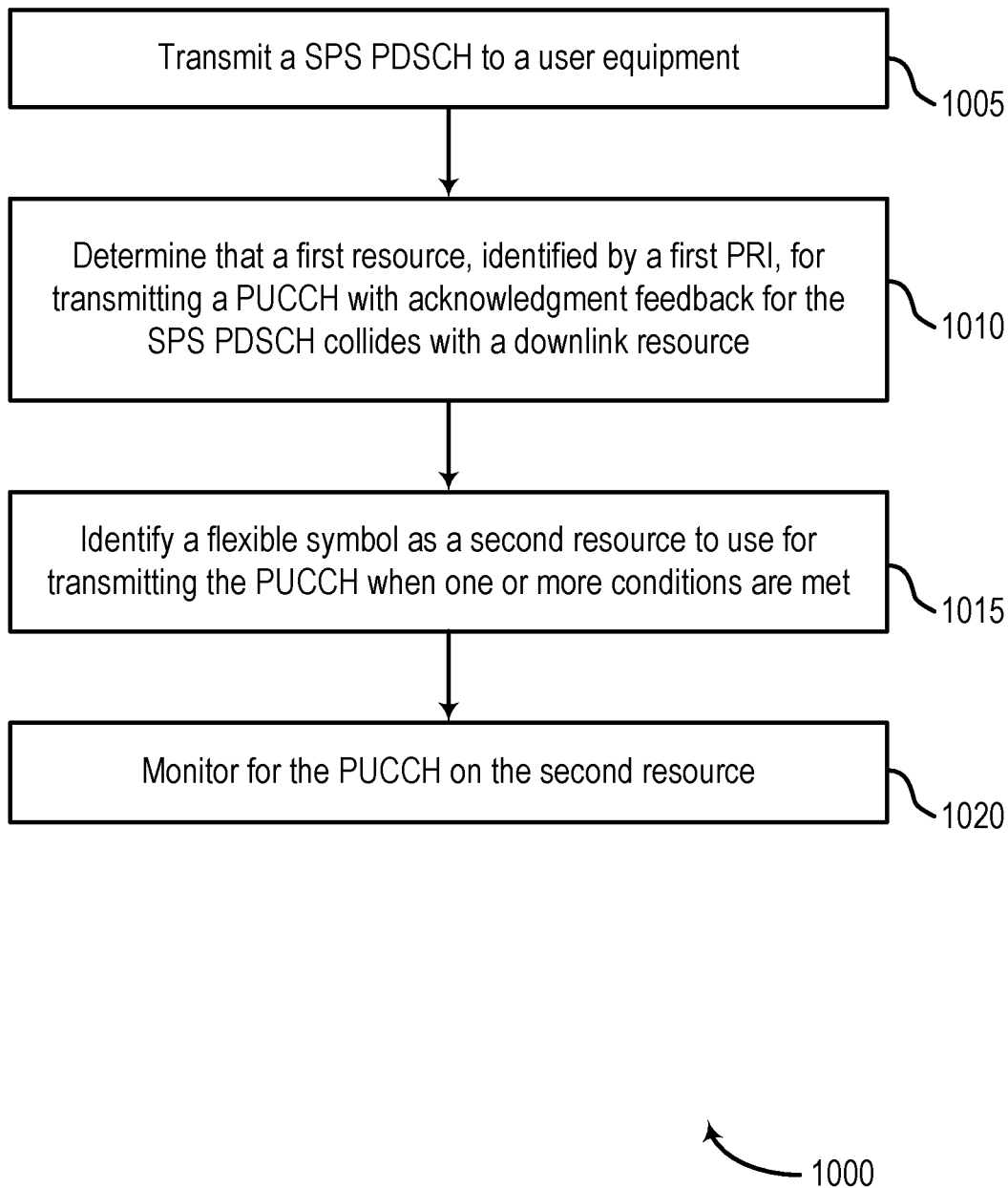

FIG. 10 shows an example of a method 1000 for management of flexible symbol resources for PUCCH according to aspects of the present disclosure. In some aspects, a base station, such as base station 102 of FIGS. 1 and 2, or processing system 1205 of FIG. 12, may perform the method 900.

At operation 1005, the system transmits a SPS PDSCH to a user equipment. In some cases, the operations of this step refer to, or may be performed by, PDSCH transmission circuitry as described with reference to FIG. 12.

At operation 1010, the system determines that a first resource, identified by a first PRI, for transmitting a PUCCH with acknowledgment feedback for the SPS PDSCH collides with a downlink resource. In some cases, the operations of this step refer to, or may be performed by, UE resource management circuitry as described with reference to FIG. 12.

At operation 1015, the system identifies a flexible symbol as a second resource to use for transmitting the PUCCH when one or more conditions are met. In some cases, the operations of this step refer to, or may be performed by, UE resource management circuitry as described with reference to FIG. 12.

At operation 1020, the system monitors for the PUCCH on the second resource. In some cases, the operations of this step refer to, or may be performed by, PUCCH reception circuitry as described with reference to FIG. 12.

In some aspects, the one or more conditions comprise a condition where the second resource comprises a resource located in a same slot as a slot in which a SFI is transmitted, a condition where the second resource is selected from one or more flexible symbols indicated as uplink symbols in the SFI, or both. In some aspects, the second resource comprises an earliest available symbol of the group of flexible symbols and uplink symbols identified in the SFI. In some aspects, method 1000 further includes monitoring a third resource for the PUCCH if the PUCCH is not received on the second resource.

In some aspects, method 1000 further includes transmitting the UE a request that the flexible symbols are not to be considered as candidates for deferred PUCCH transmission after detecting a collision between a PUCCH resource identified by a PRI with a downlink resource. In some aspects, method 1000 further includes avoiding selecting flexible symbols for deferred PUCCH transmission after transmitting the request. In some aspects, the request is transmitted via at least one of: a DCI, a MAC CE, RRC signaling, or system information.

In some aspects, method 1000 further includes receiving a request, from the user equipment, for flexible symbols to not be considered as candidates for deferred PUCCH transmission after detecting a collision between a PUCCH resource identified by a PRI with a downlink resource based on a number of available uplink symbols in a slot. In some aspects, method 1000 further includes avoiding selecting flexible symbols for deferred PUCCH transmission after transmitting the request. In some aspects, the request is received via at least one of: a SR, a MAC CE, or RRC signaling.

Example Wireless Communication Devices

Figure 11:
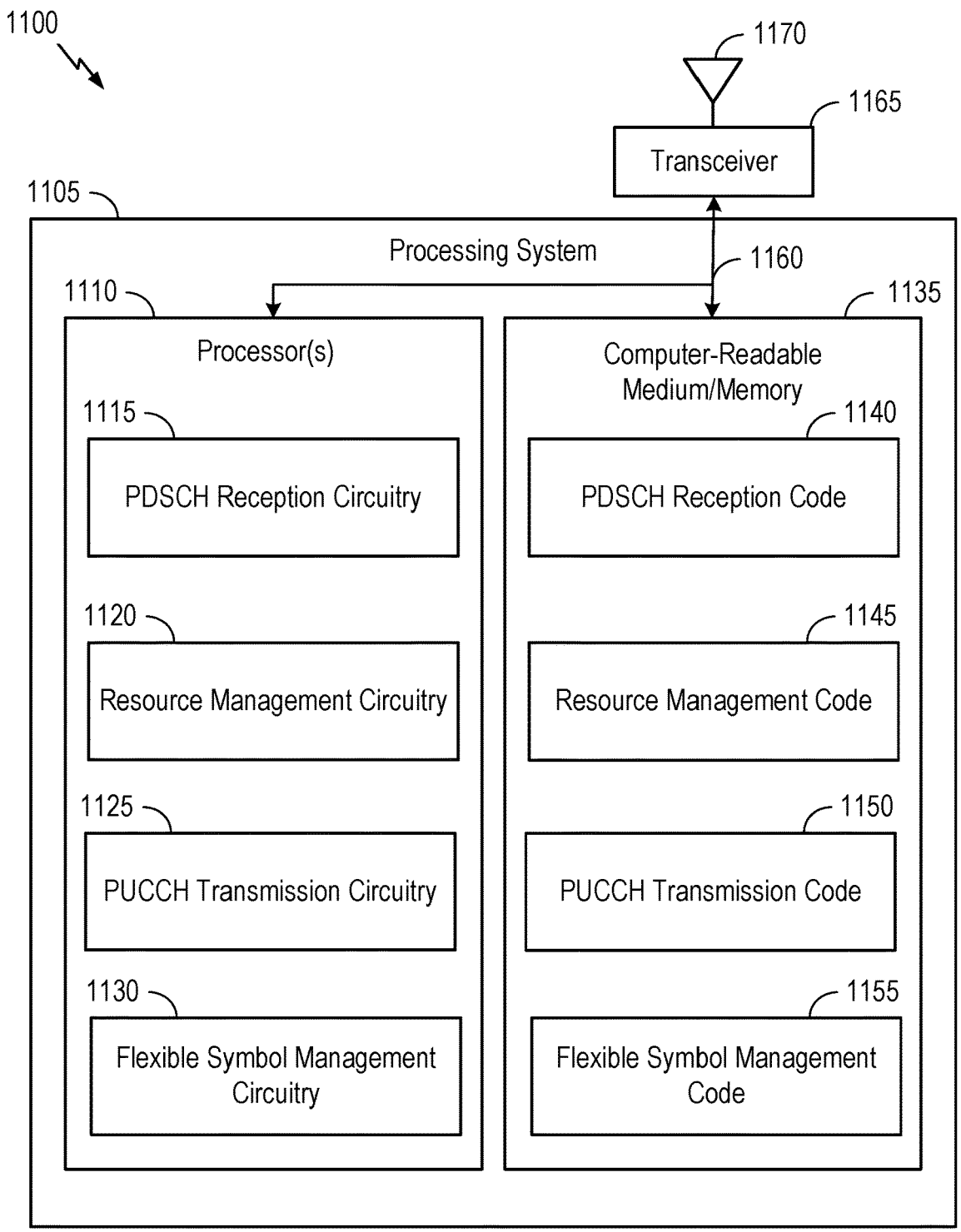
FIGS. 11 and 12 show examples of a communications device according to aspects of the present disclosure.

FIG. 11 depicts an example communications device 1100 that includes various components operable, configured, or adapted to perform operations for the techniques disclosed herein, such as the operations depicted and described with respect to FIGS. 7 and/or 9. In some examples, communication device may be a user equipment 104 as described, for example with respect to FIGS. 1 and 2.

Communications device 1100 includes a processing system 1105 coupled to a transceiver 1165 (e.g., a transmitter and/or a receiver). Transceiver 1165 is configured to transmit (or send) and receive signals for the communications device 1100 via an antenna 1170, such as the various signals as described herein. A transceiver 1165 may communicate bi-directionally, via antennas 1170, wired, or wireless links as described above. For example, the transceiver 1165 may represent a wireless transceiver 1165 and may communicate bi-directionally with another wireless transceiver 1165. The transceiver 1165 may also include or be connected to a modem to modulate the packets and provide the modulated packets to for transmission, and to demodulate received packets. In some examples, transceiver 1165 may be tuned to operate at specified frequencies. For example, a modem can configure the transceiver 1165 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1135 via a bus 1160.

In some examples, one or more processors 1110 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1135 is configured to store instructions (e.g., computer-executable code) that when executed by the one or more processors 1110, cause the one or more processors 1110 to perform the operations illustrated in FIGS. 7 and/or 9, or other operations for performing the various techniques discussed herein.

In one aspect, computer-readable medium/memory 1135 includes (e.g., stores) PDSCH reception code 1140, resource management code 1145, PUCCH transmission code 1150, and flexible symbol management code 1155.

Examples of a computer-readable medium/memory 1135 include random access memory (RAM), read-only memory (ROM), solid state memory, a hard drive, a hard disk drive, etc. In some examples, computer-readable medium/memory 1135 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIGS. 7 and/or 9.

In some examples, means for transmitting or sending (or means for outputting for transmission) may include the transceivers 254 and/or antenna(s) 252 of the user equipment 104 illustrated in FIG. 2 and/or transceiver 1165 and antenna 1170 of the communication device in FIG. 11.

In some examples, means for receiving (or means for obtaining) may include the transceivers 254 and/or antenna(s) 252 of the user equipment 104 illustrated in FIG. 2 and/or transceiver 1165 and antenna 1170 of the communication device in FIG. 11.

In some examples, means for monitoring, means for determining, means for identifying, and means for transmitting may include various processing system 1105 components, such as: the one or more processors 1110 in FIG. 11, or aspects of the user equipment 104 depicted in FIG. 2, including receive processor 258, transmit processor 264, TX MIMO processor 266, and/or controller/processor 280.

In one aspect, one or more processors 1110 includes PDSCH reception circuitry 1115, resource management circuitry 1120, PUCCH transmission circuitry 1125, and flexible symbol management circuitry 1130.

According to some aspects, PDSCH reception circuitry 1115 monitors for a SPS PDSCH.

According to some aspects, resource management circuitry 1120 determines that a first resource, identified by a first PRI, for transmitting a PUCCH with acknowledgment feedback for the SPS PDSCH collides with a downlink resource. In some examples, resource management circuitry 1120 identifies a second resource for transmitting the PUCCH based on parameters associated with the first PRI or a second PRI.

According to some aspects, resource management circuitry 1120 determines that a first resource, identified by a first PRI, for transmitting a PUCCH with acknowledgment feedback for the SPS PDSCH collides with a downlink resource. In some examples, resource management circuitry 1120 identifies a flexible symbol as a second resource to use for transmitting the PUCCH when one or more conditions are met. In some aspects, the one or more conditions include a condition where the second resource includes a resource located in a same slot as a slot in which a SFI is received, a condition where the second resource is selected from one or more flexible symbols indicated as uplink symbols in the SFI, or both. In some aspects, the second resource includes an earliest available symbol of the group of flexible symbols and uplink symbols identified in the SFI.

In some aspects, the second resource includes one or more symbols in a same slot as one or more symbols of the first resource. In some aspects, the second resource includes an earliest available symbol in the same slot. In some aspects, the second resource is identified based on the second PRI. In some aspects, the second PRI is associated with a same UCI payload as the first PRI. In some aspects, the second PRI and at least a third PRI are both associated with a same UCI payload as the first PRI, the second PRI and the third PRI are both in a same PUCCH resource set, and the second PRI is selected based on the second PRI having a lower PRI index than the third PRI. In some aspects, the second PRI and at least a third PRI are both associated with a same UCI payload as the first PRI, the second PRI is from a first PUCCH resource set and the third PRI is from a second PUCCH resource set, and the second PRI is selected based on the first PUCCH resource set having a lower PUCCH resource set index than the second PUCCH resource set.

According to some aspects, PUCCH transmission circuitry 1125 transmits the PUCCH on the second resource.

According to some aspects, flexible symbol management circuitry 1130 receives a request that the flexible symbols are not to be considered as candidates for deferred PUCCH transmission after detecting a collision between a PUCCH resource identified by a PRI with a downlink resource. In some examples, resource management circuitry 1120 avoids selecting flexible symbols for deferred PUCCH transmission based on the request. In some aspects, the request is received via at least one of: a DCI, a MAC CE, RRC signaling, or system information.

In some examples, flexible symbol management circuitry 1130 sends a request for flexible symbols to not be considered as candidates for deferred PUCCH transmission after detecting a collision between a PUCCH resource identified by a PRI with a downlink resource based on a number of available uplink symbols in a slot. In some aspects, the request is sent via at least one of: a SR, a MAC CE, or RRC signaling.

Notably, FIG. 11 is just one example, and many other examples and configurations of communication device are possible.

Figure 12:
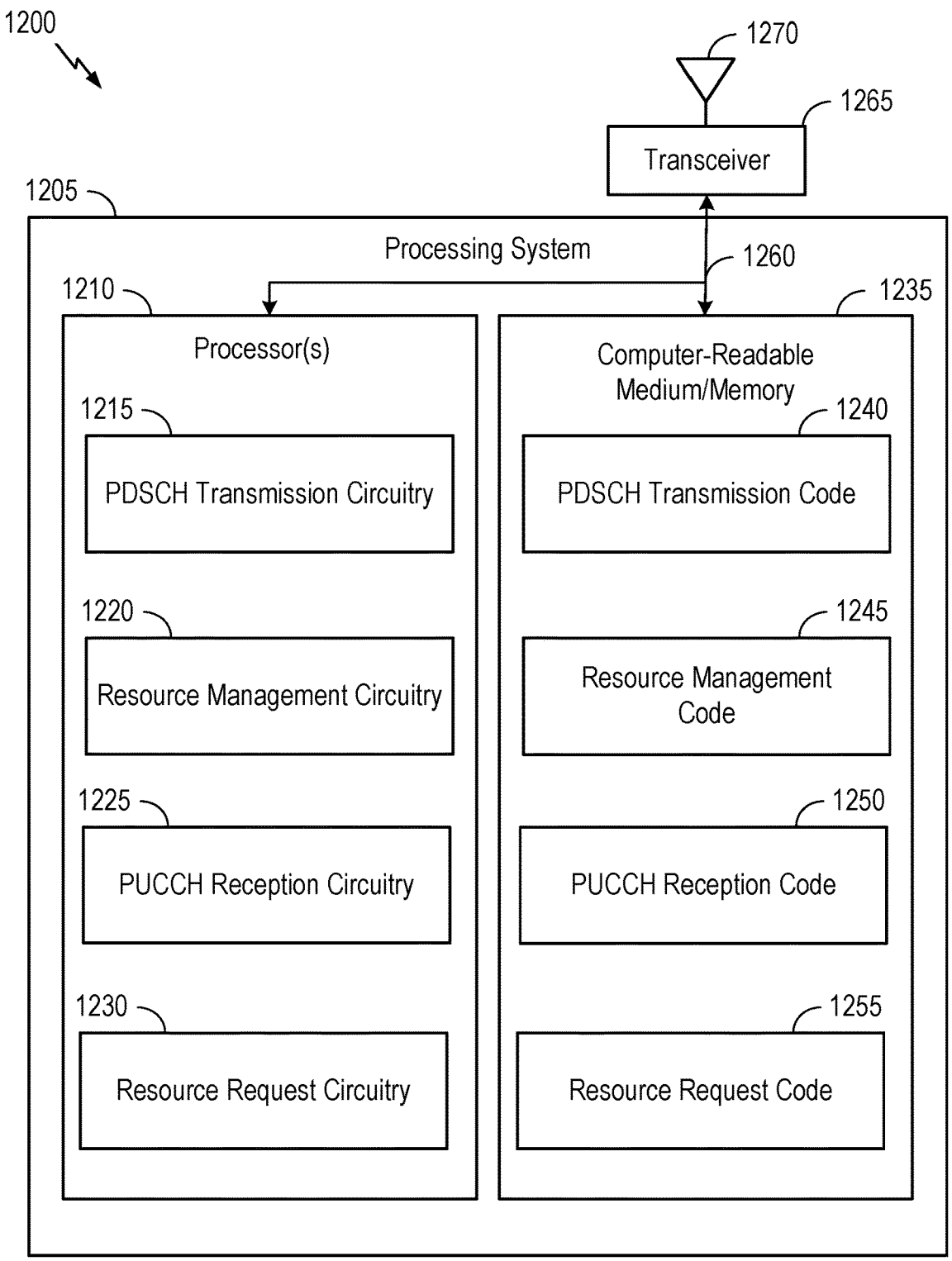

FIG. 12 depicts an example communications device 1200 that includes various components operable, configured, or adapted to perform operations for the techniques disclosed herein, such as the operations depicted and described with respect to FIGS. 8 and/or 10. In some examples, communication device may be a base station 102 as described, for example with respect to FIGS. 1 and 2.

Communications device 1200 includes a processing system 1205 coupled to a transceiver 1265 (e.g., a transmitter and/or a receiver). Transceiver 1265 is configured to transmit (or send) and receive signals for the communications device 1200 via an antenna 1270, such as the various signals as described herein. In some aspects, transceiver 1265 is an example of, or includes aspects of, the corresponding element described with reference to FIG. 11.

Processing system 1205 may be configured to perform processing functions for communications device 1200, including processing signals received and/or to be transmitted by communications device 1200. Processing system 1205 includes one or more processors 1210 coupled to a computer-readable medium/memory 1235 via a bus 1260.

In certain aspects, computer-readable medium/memory 1235 is configured to store instructions (e.g., computer-executable code) that when executed by the one or more processors 1210, cause the one or more processors 1210 to perform the operations illustrated in FIGS. 8 and/or 10, or other operations for performing the various techniques discussed herein.

In one aspect, computer-readable medium/memory 1235 includes PDSCH transmission code 1240, resource management code 1245, PUCCH reception code 1250, and resource request code 1255. In some aspects, computer-readable medium/memory 1235 is an example of, or includes aspects of, the corresponding element described with reference to FIG. 11.

Various components of communications device 1200 may provide means for performing the methods described herein, including with respect to FIGS. 8 and/or 10.

In some examples, means for transmitting or sending (or means for outputting for transmission) may include the transceivers 232 and/or antenna(s) 234 of the base station 102 illustrated in FIG. 2 and/or transceiver 1265 and antenna 1270 of the communication device in FIG. 12.

In some examples, means for receiving (or means for obtaining) may include the transceivers 232 and/or antenna(s) 234 of the base station 102 illustrated in FIG. 2 and/or transceiver 1265 and antenna 1270 of the communication device in FIG. 12.

In some examples, means for transmitting, means for determining, means for identifying, and means for monitoring may include various processing system 1205 components, such as: the one or more processors 1210 in FIG. 12, or aspects of the base station 102 depicted in FIG. 2, including receive processor 238, transmit processor 220, TX MIMO processor 230, and/or controller/processor 240.

In one aspect, one or more processors 1210 includes PDSCH transmission circuitry 1215, resource management circuitry 1220, PUCCH reception circuitry 1225, and resource request circuitry 1230. In some aspects, one or more processors 1210 are examples of, or include aspects of, the corresponding element described with reference to FIG. 11.

According to some aspects, PDSCH transmission circuitry 1215 transmits a SPS PDSCH to a UE.

According to some aspects, resource management circuitry 1220 determines that a first resource, identified by a first PRI, for receiving a PUCCH from the UE with acknowledgment feedback for the SPS PDSCH collides with a downlink resource. In some examples, resource management circuitry 1220 identifies a second resource for transmitting the PUCCH based on parameters associated with the first PRI or a second PRI.

In some aspects, the second resource includes one or more symbols in a same slot as one or more symbols of the first resource. In some aspects, the second resource includes an earliest available symbol in the same slot. In some aspects, the second resource is identified based on the second PRI. In some aspects, the second PRI is associated with a same UCI payload as the first PRI. In some aspects, the second PRI and at least a third PRI are both associated with a same UCI payload as the first PRI, the second PRI and the third PRI are both in a same PUCCH resource set, and the second PRI is selected based on the second PRI having a lower PRI index than the third PRI. In some aspects, the second PRI and at least a third PRI are both associated with a same UCI payload as the first PRI, the second PRI is from a first PUCCH resource set and the third PRI is from a second PUCCH resource set, and the second PRI is selected based on the first PUCCH resource set having a lower PUCCH resource set index than the second PUCCH resource set.

According to some aspects, resource management circuitry 1220 determines that a first resource, identified by a first PRI, for transmitting a PUCCH with acknowledgment feedback for the SPS PDSCH collides with a downlink resource. In some examples, resource management circuitry 1220 identifies a flexible symbol as a second resource to use for transmitting the PUCCH when one or more conditions are met. In some aspects, the one or more conditions include a condition where the second resource includes a resource located in a same slot as a slot in which a SFI is transmitted, a condition where the second resource is selected from one or more flexible symbols indicated as uplink symbols in the SFI, or both.

In some aspects, the second resource includes an earliest available symbol of the group of flexible symbols and uplink symbols identified in the SFI. In some examples, resource management circuitry 1220 transmits the UE a request that the flexible symbols are not to be considered as candidates for deferred PUCCH transmission after detecting a collision between a PUCCH resource identified by a PRI with a downlink resource. In some examples, resource management circuitry 1220 avoids selecting flexible symbols for deferred PUCCH transmission after transmitting the request. In some aspects, the request is transmitted via at least one of: a DCI, a MAC CE, RRC signaling, or system information.

According to some aspects, PUCCH reception circuitry 1225 monitors for the PUCCH on the second resource. In some examples, PUCCH reception circuitry 1225 monitors a third resource for the PUCCH if the PUCCH is not received on the second resource.

According to some aspects, resource request circuitry 1230 receives a request, from the user equipment, for flexible symbols to not be considered as candidates for deferred PUCCH transmission after detecting a collision between a PUCCH resource identified by a PRI with a downlink resource based on a number of available uplink symbols in a slot. In some examples, resource management circuitry 1220 avoids selecting flexible symbols for deferred PUCCH transmission after transmitting the request. In some aspects, the request is received via at least one of: a SR, a MAC CE, or RRC signaling.

Notably, FIG. 12 is just one example, and many other examples and configurations of communication device are possible.

EXAMPLE CLAUSES

Implementation examples are described in the following numbered clauses:

Clause 1: A method for wireless communications by a UE, comprising: monitoring for a SPS PDSCH; determining that a first resource, identified by a first PRI, for transmitting a PUCCH with acknowledgment feedback for the SPS PDSCH collides with a downlink resource; identifying a second resource for transmitting the PUCCH based on parameters associated with the first PRI or a second PRI; and transmitting the PUCCH on the second resource.

Clause 2: The method of Clause 1, wherein: the second resource comprises one or more symbols in a same slot as one or more symbols of the first resource.

Clause 3: The method of Clause 2, wherein: the second resource comprises an earliest available symbol in the same slot.

Clause 4: The method of any one of Clauses 1-3, wherein: the second resource is identified based on the second PRI.

Clause 5: The method of Clause 4, wherein: the second PRI is associated with a same UCI payload as the first PRI.

Clause 6: The method of Clause 5, wherein: the second PRI and at least a third PRI are both associated with a same UCI payload as the first PRI; the second PRI and the third PRI are both in a same PUCCH resource set; and the second PRI is selected based on the second PRI having a lower PRI index than the third PRI.

Clause 7: The method of Clause 5, wherein: the second PRI and at least a third PRI are both associated with a same UCI payload as the first PRI; the second PRI is from a first PUCCH resource set and the third PRI is from a second PUCCH resource set; and the second PRI is selected based on the first PUCCH resource set having a lower PUCCH resource set index than the second PUCCH resource set.

Clause 8: A for wireless communications by a network entity, comprising: transmitting a SPS PDSCH to a UE; determining that a first resource, identified by a first PRI, for receiving a PUCCH from the UE with acknowledgment feedback for the SPS PDSCH collides with a downlink resource; identifying a second resource for transmitting the PUCCH based on parameters associated with the first PRI or a second PRI; and monitoring for the PUCCH on the second resource.

Clause 9: The method of Clause 8, wherein: the second resource comprises one or more symbols in a same slot as one or more symbols of the first resource.

Clause 10: The method of Clause 9, wherein: the second resource comprises an earliest available symbol in the same slot.

Clause 11: The method of any one of Clauses 8-10, wherein: the second resource is identified based on the second PRI.

Clause 12: The method of Clause 11, wherein: the second PRI is associated with a same UCI payload as the first PRI.

Clause 13: The method of Clause 12, wherein: the second PRI and at least a third PRI are both associated with a same UCI payload as the first PRI; the second PRI and the third PRI are both in a same PUCCH resource set; and the second PRI is selected based on the second PRI having a lower PRI index than the third PRI.

Clause 14: The method of Clause 12, wherein: the second PRI and at least a third PRI are both associated with a same UCI payload as the first PRI; the second PRI is from a first PUCCH resource set and the third PRI is from a second PUCCH resource set; and the second PRI is selected based on the first PUCCH resource set having a lower PUCCH resource set index than the second PUCCH resource set.

Clause 15: A method for wireless communication by a UE, comprising: monitoring for a SPS PDSCH; determining that a first resource, identified by a first PRI, for transmitting a PUCCH with acknowledgment feedback for the SPS PDSCH collides with a downlink resource; identifying a flexible symbol as a second resource to use for transmitting the PUCCH when one or more conditions are met; and transmitting the PUCCH on the second resource.

Clause 16: The method of Clause 15, wherein: the one or more conditions comprise a condition where the second resource comprises a resource located in a same slot as a slot in which a SFI is received, a condition where the second resource is selected from one or more flexible symbols indicated as uplink symbols in the SFI, or both.

Clause 17: The method of Clause 16, wherein: the second resource comprises an earliest available symbol of the group of flexible symbols and uplink symbols identified in the SFI.

Clause 18: The method of any one of Clauses 15-17, further comprising: receiving a request that the flexible symbols are not to be considered as candidates for deferred PUCCH transmission after detecting a collision between a PUCCH resource identified by a PRI with a downlink resource; and avoiding selecting flexible symbols for deferred PUCCH transmission based on the request.

Clause 19: The method of Clause 18, wherein: the request is received via at least one of: a DCI, a MAC CE, RRC signaling, or system information.

Clause 20: The method of any one of Clauses 15-19, further comprising: sending a request for flexible symbols to not be considered as candidates for deferred PUCCH transmission after detecting a collision between a PUCCH resource identified by a PRI with a downlink resource based on a number of available uplink symbols in a slot.

Clause 21: The method of Clause 20, wherein: the request is sent via at least one of: a SR, a MAC CE, or RRC signaling.

Clause 22: A method for wireless communication at a network entity, comprising: transmitting a SPS PDSCH to a user equipment; determining that a first resource, identified by a first PRI, for transmitting a PUCCH with acknowledgment feedback for the SPS PDSCH collides with a downlink resource; identifying a flexible symbol as a second resource to use for transmitting the PUCCH when one or more conditions are met; and monitoring for the PUCCH on the second resource.

Clause 23: The method of Clause 22, wherein: the one or more conditions comprise a condition where the second resource comprises a resource located in a same slot as a slot in which a SFI is transmitted, a condition where the second resource is selected from one or more flexible symbols indicated as uplink symbols in the SFI, or both.

Clause 24: The method of Clause 23, wherein: the second resource comprises an earliest available symbol of the group of flexible symbols and uplink symbols identified in the SFI.

Clause 25 The method of Clause 23, further comprising: monitoring a third resource for the PUCCH if the PUCCH is not received on the second resource.

Clause 26: The method of any one of Clauses 22-25, further comprising: transmitting the UE a request that the flexible symbols are not to be considered as candidates for deferred PUCCH transmission after detecting a collision between a PUCCH resource identified by a PRI with a downlink resource; and avoiding selecting flexible symbols for deferred PUCCH transmission after transmitting the request.

Clause 27: The method of Clause 12, wherein: the request is transmitted via at least one of: a DCI, a MAC CE, RRC signaling, or system information.

Clause 28: The method of any one of Clauses 22-25, further comprising: receiving a request, from the user equipment, for flexible symbols to not be considered as candidates for deferred PUCCH transmission after detecting a collision between a PUCCH resource identified by a PRI with a downlink resource based on a number of available uplink symbols in a slot; and avoiding selecting flexible symbols for deferred PUCCH transmission after transmitting the request.

Clause 29: The method of Clause 28, wherein: the request is received via at least one of: a SR, a MAC CE, or RRC signaling.

Clause 30: A processing system, comprising: a memory comprising computer-executable instructions; one or more processors configured to execute the computer-executable instructions and cause the processing system to perform a method in accordance with any one of Clauses 1-29.

Clause 31: A processing system, comprising means for performing a method in accordance with any one of Clauses 1-29.

Clause 32: A non-transitory computer-readable medium comprising computer-executable instructions that, when executed by one or more processors of a processing system, cause the processing system to perform a method in accordance with any one of Clauses 1-29.

Clause 33: A computer program product embodied on a computer-readable storage medium comprising code for performing a method in accordance with any one of Clauses 1-29.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mm Wave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28

(with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of identifying resources for use in deferred transmission of acknowledgment/negative acknowledgment (ACK/NACK) feedback in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
   monitoring for a semi-persistently scheduled (SPS) physical downlink shared channel (PDSCH);
   determining that a first resource, identified by a first physical uplink control channel (PUCCH) resource identifier (PRI), for transmitting a physical uplink control channel (PUCCH) with acknowledgment feedback for the SPS PDSCH collides with a downlink resource;
   identifying a second resource for transmitting the PUCCH based on parameters associated with the first PRI or a second PRI;
   transmitting the PUCCH on the second resource; and
   wherein the second resource comprises one or more symbols in a same slot as one or more symbols of the first resource.

2. The method of claim 1, wherein the second resource comprises an earliest available symbol in the same slot.

3. The method of claim 1, wherein the second resource is identified based on the second PRI.

4. The method of claim 3, wherein the second PRI is associated with a same uplink control information (UCI) payload as the first PRI.

5. The method of claim 1, wherein:
   the second PRI and at least a third PRI are both associated with a same UCI payload as the first PRI and are in a same PUCCH resource set; and
   the second PRI is selected based on the second PRI having a lower PRI index than the third PRI.

6. A method for wireless communications by a network entity, comprising:
   transmitting a semi-persistently scheduled (SPS) physical downlink shared channel (PDSCH) to a user equipment (UE);
   determining that a first resource, identified by a first physical uplink control channel (PUCCH) resource identifier (PRI), for receiving a physical uplink control channel (PUCCH) from the UE with acknowledgment feedback for the SPS PDSCH collides with a downlink resource;
   identifying a second resource for transmitting the PUCCH based on parameters associated with the first PRI or a second PRI;
   monitoring for the PUCCH on the second resource; and
   wherein the second resource comprises one or more symbols in a same slot as one or more symbols of the first resource.

7. The method of claim 6, wherein the second resource comprises an earliest available symbol in the same slot.

8. The method of claim 6, wherein the second resource is identified based on the second PRI.

9. The method of claim 8, wherein the second PRI is associated with a same uplink control information (UCI) payload as the first PRI.

10. The method of claim 6, wherein:
    the second PRI and at least a third PRI are both associated with a same UCI payload as the first PRI and are in a same PUCCH resource set; and
    the second PRI is selected based on the second PRI having a lower PRI index than the third PRI.

11. An apparatus for wireless communications by a user equipment (UE), comprising:
    a memory having executable instructions stored thereon; and
    a processor configured to execute the executable instructions in order to cause the apparatus to:
    monitor for a semi-persistently scheduled (SPS) physical downlink shared channel (PDSCH);
    determine that a first resource, identified by a first physical uplink control channel (PUCCH) resource identifier (PRI), for transmitting a physical uplink control channel (PUCCH) with acknowledgment feedback for the SPS PDSCH collides with a downlink resource;

identify a second resource for transmitting the PUCCH based on parameters associated with the first PRI or a second PRI;

transmit the PUCCH on the second resource; and wherein the second resource comprises one or more symbols in a same slot as one or more symbols of the first resource.

12. The apparatus of claim 11, wherein the second resource comprises an earliest available symbol in the same slot.

13. The apparatus of claim 11, wherein the second resource is identified based on the second PRI.

14. The apparatus of claim 13, wherein the second PRI is associated with a same uplink control information (UCI) payload as the first PRI.

15. The apparatus of claim 11, wherein:

the second PRI and at least a third PRI are both associated with a same UCI payload as the first PRI and are in a same PUCCH resource set; and the second PRI is selected based on the second PRI having a lower PRI index than the third PRI.

16. An apparatus for wireless communications by a network entity, comprising:

a memory having executable instructions stored thereon; and a processor configured to execute the executable instructions in order to cause the apparatus to:

transmit a semi-persistently scheduled (SPS) physical downlink shared channel (PDSCH) to a user equipment (UE);

determine that a first resource, identified by a first physical uplink control channel (PUCCH) resource identifier (PRI), for receiving a physical uplink control channel (PUCCH) from the UE with acknowledgment feedback for the SPS PDSCH collides with a downlink resource;

identify a second resource for transmitting the PUCCH based on parameters associated with the first PRI or a second PRI;

monitor for the PUCCH on the second resource; and wherein the second resource comprises one or more symbols in a same slot as one or more symbols of the first resource.

17. The apparatus of claim 16, wherein the second resource comprises an earliest available symbol in the same slot.

18. The apparatus of claim 16, wherein the second resource is identified based on the second PRI.

19. The apparatus of claim 18, wherein the second PRI is associated with a same uplink control information (UCI) payload as the first PRI.

20. The apparatus of claim 16, wherein:

the second PRI and at least a third PRI are both associated with a same UCI payload as the first PRI and are in a same PUCCH resource set; and the second PRI is selected based on the second PRI having a lower PRI index than the third PRI.

* * * * *